(12) United States Patent
Schuttenberg

(10) Patent No.: US 10,474,469 B2
(45) Date of Patent: Nov. 12, 2019

(54) APPARATUS AND METHOD FOR DETERMINING A RECOVERY POINT FROM WHICH TO RESUME INSTRUCTION EXECUTION FOLLOWING HANDLING OF AN UNEXPECTED CHANGE IN INSTRUCTION FLOW

(71) Applicant: ARM Limited, Cambridge (GB)

(72) Inventor: Kim Richard Schuttenberg, Gilbert, AZ (US)

(73) Assignee: ARM Limited, Cambridge (GB)

( * ) Notice: Subject to any disclaimer, the term of this patent is extended or adjusted under 35 U.S.C. 154(b) by 182 days.

(21) Appl. No.: 15/485,507

(22) Filed: Apr. 12, 2017

(65) Prior Publication Data

US 2018/0300148 A1 Oct. 18, 2018

(51) Int. Cl.
*G06F 9/38* (2018.01)
*G06F 9/30* (2018.01)

(52) U.S. Cl.
CPC ........ *G06F 9/3861* (2013.01); *G06F 9/30043* (2013.01); *G06F 9/3842* (2013.01); *G06F 9/3863* (2013.01)

(58) Field of Classification Search
CPC .................................................. G06F 9/3861
See application file for complete search history.

(56) References Cited

U.S. PATENT DOCUMENTS 9,411,964 B1 * 8/2016 Moritz ................. G06F 21/577
2010/0153776 A1   6/2010 Vick et al.
(Continued)

OTHER PUBLICATIONS

Search Report dated Sep. 27, 2018 in GB Application No. 1803580.8, 4 pages.
(Continued)

*Primary Examiner* — Michael J Metzger
(74) *Attorney, Agent, or Firm* — Nixon & Vanderhye P.C.

(57) ABSTRACT

An apparatus and method are provided for determining a recovery point from which to resume instruction execution following handling of an unexpected change in instruction flow. The apparatus comprises processing circuitry having an associated instruction set architecture, and arranged to execute software comprising instructions defined by the instruction set architecture, and control circuitry for controlling operation of the processing circuitry according to constraints defined by the instruction set architecture. The instruction set architecture defines a default recovery point constraint for determining a recovery point from which to resume instruction execution following handling of an unexpected change in instruction flow. The control circuitry is responsive to information derived from the software executing on the processing circuitry to detect a recovery point relaxation condition, and responsive to the recovery point relaxation condition, to allow determination of the recovery point unconstrained by the default recovery point constraint. Hence, the described techniques provide a mechanism by which the ISA may allow the software to inform the hardware of situations where the recovery point constraint can be relaxed, in such situations this enabling the processing circuitry to potentially execute the code with increased performance and/or reduced power consumption.

24 Claims, 14 Drawing Sheets

(56) References Cited

U.S. PATENT DOCUMENTS

| | | |
|---|---|---|
| 2011/0153999 A1 | 6/2011 | Borin et al. |
| 2013/0173885 A1* | 7/2013 | Watanabe ............. G06F 9/3806 712/205 |
| 2014/0032884 A1* | 1/2014 | Krishna ................ G06F 9/3836 712/228 |

OTHER PUBLICATIONS

Lozano et al., "Exploiting Short-Lived Variables in Superscalar Processors", *Micro* '28, Dec. 1, 1995, pp. 292-302.

* cited by examiner

ISA DEFAULT RECOVERY
POINT CONSTRAINT

RECOVERY POINT 1 ⟶ INST$^N$ A

RECOVERY POINT 2 ⟶ INST$^N$ B

RECOVERY POINT 3 ⟶ INST$^N$ C (LOAD)

RECOVERY POINT 4 ⟶ INST$^N$ D

RECOVERY POINT 5 ⟶ INST$^N$ E (STORE)

RECOVERY POINT 6 ⟶ INST$^N$ F

FIG. 4A

EXAMPLE RELAXED
RECOVERY POINT CONSTRAINT

RECOVERY POINT 1 ⟶ INST$^N$ A

INST$^N$ B

INST$^N$ C (REPEATABLE LOAD)

INST$^N$ D

INST$^N$ E (REPEATABLE STORE)

INST$^N$ F

FIG. 4B

APPARATUS AND METHOD FOR DETERMINING A RECOVERY POINT FROM WHICH TO RESUME INSTRUCTION EXECUTION FOLLOWING HANDLING OF AN UNEXPECTED CHANGE IN INSTRUCTION FLOW

BACKGROUND

The present technique relates to an apparatus and method for determining a recovery point from which to resume instruction execution following handling of an unexpected change in instruction flow.

When designing modern data processing systems, a general aim is to increase performance and/or reduce power consumption, whilst maintaining correct operation in respect of the software executing on the processor. "Correct operation" is often at odds with the other goals of increased performance and low power consumption, but is a necessity.

The Instruction Set Architecture (ISA) is the part of the processor that is visible to the programmer or compiler writer, and the ISA serves as the boundary between software and hardware. The ISA is typically defined such that any software can be written using the instructions of the instruction set defined by the ISA, and as a result the requirements and constraints specified by the ISA need to ensure correct operation for any software that may be written to execute on the processor.

One of the constraints defined by the ISA is a default constraint for determining a recovery point from which to resume instruction execution following an unexpected change in instruction flow. For example, various faults or interrupts may cause the execution of the software to be temporarily halted whilst one or more exception routines are executed, and it then needs to be determined where to restart execution of the software following completion of the exception routine. Similarly, a branch resteer mechanism may be triggered when it is determined that there has been a branch misprediction, and again it needs to be determined where instruction execution should be resumed from as a result of that branch resteer. The ISA will define recovery points for these scenarios with the aim of ensuring correct execution behaviour for any software that may be written to execute on the processor.

However, such constraints can significantly impact the processor's ability to seek to obtain performance and/or power consumption improvements when executing software.

SUMMARY

In one example configuration, there is provided an apparatus comprising: processing circuitry having an associated instruction set architecture, and arranged to execute software comprising instructions defined by the instruction set architecture; and control circuitry to control operation of the processing circuitry according to constraints defined by the instruction set architecture; the instruction set architecture defining a default recovery point constraint for determining a recovery point from which to resume instruction execution following handling of an unexpected change in instruction flow; and the control circuitry being responsive to information derived from the software executing on the processing circuitry to detect a recovery point relaxation condition, and responsive to said recovery point relaxation condition to allow determination of the recovery point unconstrained by the default recovery point constraint.

In another example configuration, there is provided a method of determining a recovery point from which to resume instruction execution following handling of an unexpected change in instruction flow, the method comprising: executing software on processing circuitry having an associated instruction set architecture, the software comprising instructions defined by the instruction set architecture; controlling operation of the processing circuitry according to constraints defined by the instruction set architecture; defining within the instruction set architecture a default recovery point constraint for determining the recovery point; detecting presence of a recovery point relaxation condition based on information derived from the software executing on the processing circuitry; and responsive to detection of said recovery point relaxation condition, allowing determination of the recovery point unconstrained by the default recovery point constraint.

In a yet further example configuration, there is provided an apparatus comprising: processing means for executing software comprising instructions defined by an instruction set architecture associated with the processing means; and control means for controlling operation of the processing means according to constraints defined by the instruction set architecture; the instruction set architecture defining a default recovery point constraint for determining a recovery point from which to resume instruction execution following handling of an unexpected change in instruction flow; and the control means for detecting, in response to information derived from the software executing on the processing means, a recovery point relaxation condition, and responsive to said recovery point relaxation condition for allowing determination of the recovery point unconstrained by the default recovery point constraint.

In a still further example configuration there is provided a virtual machine computer program comprising program instructions to control a host data processing apparatus to provide an instruction execution environment corresponding to the apparatus described herein. In a further example configuration there may be provided a computer-readable storage medium storing such a virtual machine computer program.

BRIEF DESCRIPTION OF THE DRAWINGS

The present technique will be described further, by way of example only, with reference to embodiments thereof as illustrated in the accompanying drawings, in which:

FIG. 4A schematically illustrates recovery points that may be defined by the default constraints of the ISA for an example sequence of code, whilst FIG. 4B schematically illustrates a relaxed recovery point constraint that may be applied in accordance with one embodiment;

DESCRIPTION OF EMBODIMENTS

Figure 1:
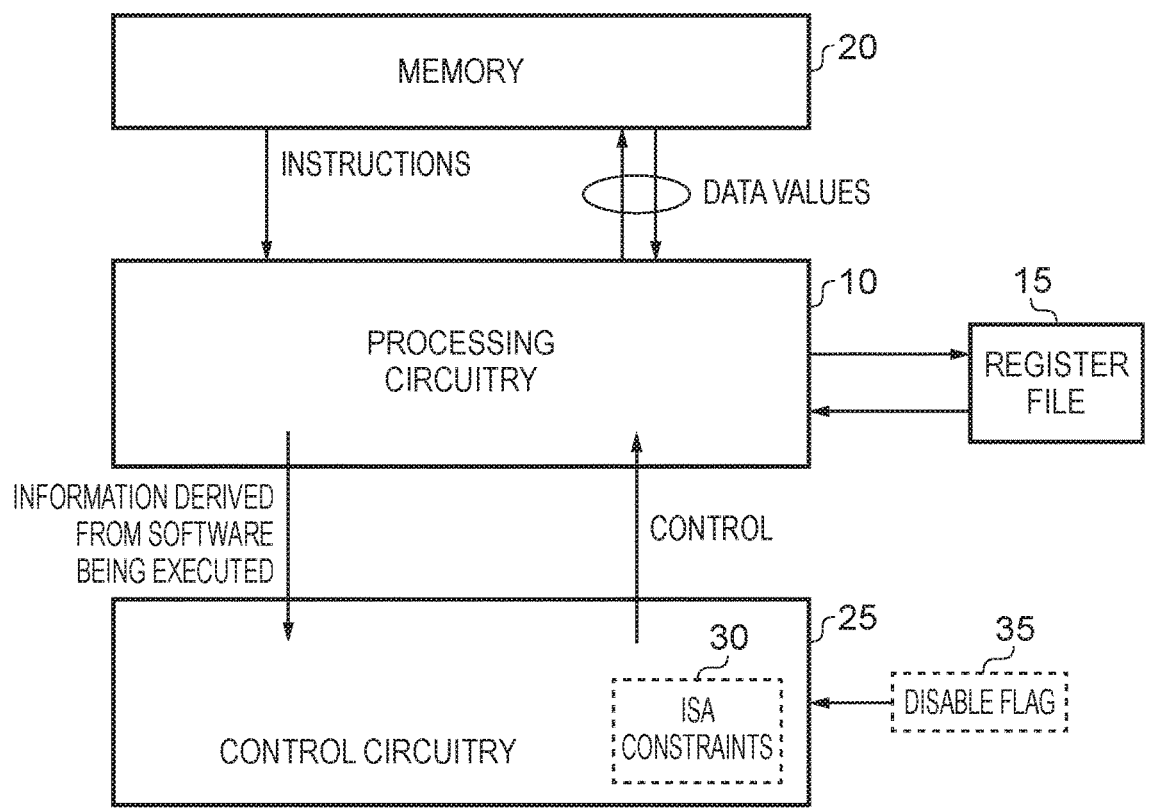
FIG. 1 is a block diagram of an apparatus in accordance with one embodiment.

Before discussing the embodiments with reference to the accompanying figures, the following description of embodiments is provided.

In accordance with one embodiment, an apparatus is provided comprising processing circuitry having an associated instruction set architecture, and control circuitry to control operation of the processing circuitry. In particular, the processing circuitry is arranged to execute software comprising instructions defined by the instruction set architecture, and the control circuitry controls operation of the processing circuitry according to constraints defined by the instruction set architecture. The instruction set architecture defines a default recovery point constraint for determining a recovery point from which to resume instruction execution following handling of an unexpected change in instruction flow. The unexpected change in instruction flow can arise for a variety of reasons, for example due to a fault or interrupt being detected, or due to a branch resteer condition being detected. When a fault or an interrupt occurs, this will typically cause the execution of the software to be halted, and an exception routine to be executed, for example by the operating system, in order to seek to resolve the issue that gave rise to the fault or interrupt. Following execution of the exception handling routine, then execution of the original software can resume, and the default recovery point constraint will define the appropriate recovery point for each of the possible faults/interrupts. For example, this may define that execution resumes from the instruction that was being executed at the time the fault/interrupt occurred, or for certain types of fault/interrupt may identify that execution should resume from the next instruction. Similarly, on detection of a branch resteer condition, for example due to it being determined that a preceding branch has been mispredicted (and accordingly the instruction flow determined by the branch prediction is incorrect), the default recovery point constraint will identify where execution of the code should be resumed from, and hence identify the applicable recovery point. As mentioned earlier, the ISA is defined so that any software can be written to execute on the processor using the instructions defined by the ISA, and accordingly the default recovery point constraint is defined in a way that ensures correct operation for any code that may be written to run on the processor.

However, in accordance with the techniques described herein, a mechanism is provided to enable the software to indicate to the hardware when the rigid requirements of the default constraint are not required. In particular, in one embodiment the control circuitry is responsive to information derived from the software executing on the processing circuitry to detect a recovery point relaxation condition. On detecting the recovery point relaxation condition, the control circuitry then allows determination of the recovery point unconstrained by the default recovery point constraint. This hence provides the processing circuitry with improved flexibility as to the choice of recovery point, and hence increases the freedoms that the processing circuitry has when seeking to increase performance or reduce power consumption when executing the software.

Accordingly, it can be seen that in the described embodiments the ISA allows the software to inform the hardware of situations where the default recovery point constraint is more restrictive than it need be, thereby allowing the processing circuitry to achieve more efficient processing through the improved flexibility to determine the recovery point.

In one embodiment, on detecting the recovery point relaxation condition, the processing circuitry's freedom to select the recovery point may be relatively unconstrained. However, in an alternative embodiment the control circuitry may be arranged to cause the recovery point to be determined in accordance with a relaxed recovery point constraint providing increased flexibility as to the choice of recovery point when compared with the default recovery point constraint. Hence, in this embodiment a recovery point constraint is still defined, that is a relaxed recovery point constraint relative to the default recovery point constraint defined by the ISA.

In one embodiment, the processing circuitry is arranged to retain execution state for determined execution points within the software being executed by the processing circuitry, to enable one of the determined execution points to be selected as the recovery point on resuming instruction execution following handling of an unexpected change in instruction flow. In the presence of the recovery point relaxation condition, the control circuitry is arranged to cause an increase in the number of instructions executed between each determined execution point for which said execution state is retained.

The execution state retained for each determined execution point can take a variety of forms. In one embodiment, this execution state (which may also be referred to herein as state information) is sufficient to allow identification of the programmer visible state that was present at the associated execution point. The programmer visible state may be considered to be the register state and execution behaviour defined by the architecture for the processing circuitry and presented to a programmer of that processing circuitry for each instruction to act upon. Any given implementation need not represent or organise this state in the exact manner implied, and may at any point in time have a plurality of versions of this state representing either past or speculative future versions. The state information may also be stored differentially, e.g. as a list of changes), to save storage space.

Hence, speculative execution of instructions may still be supported, but it is required that the programmer visible state at the point of execution of an instruction associated with a determined execution point can be recovered from at least one version of the state information being maintained by the processing circuitry, until such time as it can be determined that no fault has arisen when performing the associated instruction.

Hence, it will be appreciated that the requirement to retain execution state for a significant number of execution points can significantly limit the processing circuitry's ability to seek to optimise performance or power consumption when executing the software. However, in the presence of the recovery point relaxation condition, the number of execution points for which execution state needs to be retained can be significantly reduced, hence enabling a larger number of instructions to be executed between each determined execution point for which execution state is retained. This can then allow the processing circuitry to perform certain optimisations (such as micro-architectural improvements) in order to seek to improve performance and/or reduce energy consumption. As an unexhaustive list of possible micro-architectural improvements that could be made, these may include improved ability to fuse certain operations, increased use of vector processing, improved register data lifetime detection, increased extractable parallelism in a superscalar design, and/or decreased storage requirements for certain processor designs, for example processors that support out-of-order execution.

There are a number of ways in which the recovery point relaxation condition can be determined. However, in one embodiment the software comprises one or more memory access instructions used to move data between memory and registers accessible to the processing circuitry, and the recovery point relaxation condition is determined when said information derived from the software executing on the processing circuitry identifies one or more of said memory access instructions as being repeatable.

Memory access instructions may either be load instructions used to load data from memory into one or more working registers of the processor, or store instructions used to store data from the working registers back to memory. Often, it has to be assumed that such load and store instructions are non-repeatable, i.e. it cannot be guaranteed that if a load or a store instruction is repeated at a later point, the same result will be achieved. This is due, for example, to memory aliasing techniques that may be used. For instance, in the popular "C" programming language, memory aliasing in function parameters is assumed. If it has to be assumed that the memory access instructions are not repeatable, then this prevents relaxing of the default recovery point constraint, since correct operation cannot be ensured if that default recovery point constraint is not used. However, in some instances the software programmer or compiler will know whether memory aliasing is present or not. For example, many compilers have a pragma directive that allows more efficient code generation when it is known that memory aliasing does not exist, and other languages (such as FORTRAN) show improved data processing capabilities by taking advantage of situations where memory aliasing cases are known ahead of time.

To the extent that the compiler or software programmer is aware of such cases, then the present technique allows a mechanism for the software to inform the hardware accordingly, and in particular to identify sections of code where memory access instructions contained within that section are repeatable.

There are a number of ways in which the relaxation in the setting of the recovery point can be exercised by the processing circuitry in the presence of the recovery point relaxation condition. For example, in one embodiment, the recovery point is settable to an execution point in the software prior to a memory access instruction identified as repeatable, irrespective of whether the unexpected change in instruction flow occurs at an execution point after that memory access instruction. Hence, a recovery point need not be associated with the memory access instruction itself, and can be set at some earlier point in the execution flow, that allows the processing circuitry to make certain micro-architectural optimisations. Whilst this may in some instances require a larger portion of the code to be re-executed if an unexpected change in instruction flow does occur, in the absence of such an unexpected change in instruction flow significant performance and/or energy consumption benefits may be realised.

There are a number of mechanisms that may be used in the described embodiments to allow the software to identify to the hardware when the recovery point condition can be relaxed. In one embodiment, the instruction set architecture provides one or more memory access instructions defined as repeatable memory access instructions, and the recovery point relaxation condition is determined when the processing circuitry is executing a section of code within the software whose memory access instructions are said repeatable memory access instructions.

Hence, in accordance with this embodiment, "repeatable" variants of various load and store instructions may be provided by the instruction set architecture, and the control circuitry can detect when the memory access instructions specified within a sequence of code are marked as repeatable memory access instructions.

In an alternative embodiment the apparatus may provide control storage comprising a recovery point relaxation field whose value is set under control of the software executing on the processing circuitry. The recovery point relaxation condition is then determined when the processing circuitry is executing a section of code containing at least one memory access instruction, and the value in said recovery point relaxation field is set to a first value identifying that said at least one memory access instruction is repeatable. Hence, in accordance with this embodiment, whenever the recovery point relaxation field is set to a first value, the control storage will determine that any load or store instructions executed can be treated as repeatable load or store instructions, hence allowing the recovery point relaxation condition to be detected.

In one embodiment, memory access instructions will typically specify a virtual address, and the processing circuitry may be arranged on executing each memory access instruction to perform an address translation operation with reference to one or more page table entries in order to identify, for the specified virtual address, a corresponding physical address to be accessed. Within systems employing such a virtual addressing scheme, then as an alternative to the mechanisms described above, the recovery point relaxation condition may be determined when the processing circuitry is executing a section of code containing at least one memory access instruction, and during the address translation operation a software-controlled field within at least one page table entry identifies that a memory access instruction accessing a region of memory associated with that page table entry is repeatable. Hence, in accordance with this embodiment, particular regions of memory can be marked as repeatable, so that any load or store instructions that access those regions are treated as repeatable memory access instructions.

Typically, processing circuitry may be provided with address hazard checking circuitry for seeking to detect address hazards such as read after write (RAW) hazards, write after read (WAR) hazards or write after write (WAW) hazards. However, in one embodiment, the processing circuitry may be arranged, for a section of code containing multiple memory access instructions that are identified as being repeatable, to avoid performing address hazard checking for the addresses to be accessed for those multiple memory access instructions. Accordingly, this can reduce energy consumption, and potentially improve performance within the processing circuitry, by reducing the utilisation of the address hazard checking circuitry when executing the software.

In one embodiment, memory barrier operations can be used to delimit sections of code that contain repeatable memory access instructions. For example, following execution of a section of code containing at least one memory access instruction that is repeatable, the software may be arranged to cause the processing circuitry to execute a barrier operation to re-enable address hazard checking prior to execution of subsequent memory access instructions that cannot be guaranteed by the software to be repeatable. Hence, the barrier operation can be used to "bookend" sections of code that contain repeatable memory access instructions.

Whilst the barrier operation can be used at the end of a section of code containing repeatable memory access instructions, and prior to execution of code that does not contain memory access instructions that are repeatable, it can also be used to ensure that hazard checking is enforced between any repeatable operations that are on opposite sides of the barrier, thereby allowing software to separate different sections of code that may not be repeatable with respect to each other, but that are repeatable within themselves.

Further, a barrier operation can also be used in one embodiment before execution of a section of code that is repeatable, for instance to delay the optimisation of the repeatable memory accesses until memory is allocated for that section of code to work on.

In one embodiment, the memory access instruction identified as repeatable may comprise at least one store instruction executed in order to store data from one or more registers to the memory. In one such embodiment, the processing circuitry may be arranged, when executing a section of code in the presence of said recovery point relaxation condition, to allow the data identified by a repeatable store instruction to be stored to memory, irrespective of whether an exception state of another memory access instruction marked as repeatable within said section of code is at that point unresolved. Hence, the results of the store instruction can be committed, even if the exception state of earlier memory access instructions is not yet resolved. This can reduce the storage requirements in various types of processing circuits, for example by reducing the amount of storage required within the store queue of an out-of-order processor for storing the results of pending store operations. In particular, the store operations can be committed sooner than they might otherwise be able to, hence reducing the amount of time that the data needs to be held within the store queue, and hence potentially reducing the number of items that need to be retained within the store queue.

In one embodiment, the processing circuitry may further be arranged, when executing a section of code in the presence of said recovery point relaxation condition, to allow the data identified by the repeatable store instruction to be stored to memory, irrespective of whether correctness of branch resolution of a prior branch instruction is at that point determined. In accordance with the default recovery point constraint, a recovery point would normally need to be associated with a branch instruction, but in the presence of the recovery point relaxation condition this constraint can be removed. This can significantly increase performance, for example by allowing multiple iterations of a loop to be performed in parallel. Whilst in the event of an unexpected change in instruction flow, resumption of execution may need to occur from a point earlier in the code than would have been the case if the default recovery point constraint had been applied, where no such unexpected change in instruction flow occurs the ability to use relaxed recovery point constraints enables a significant increase in performance to be achieved due to the ability to parallelise the execution of multiple loop iterations.

There are a number of ways in which the branch instruction can be arranged to allow earlier store operations to commit their results to memory even before that branch instruction's branch has been resolved, but in one embodiment the prior branch instruction may be flagged so as to prevent that prior branch instruction inhibiting completion of the repeatable store instruction. This could for example involve creating particular variants of certain branch instructions, or by maintaining some control information that is applied in respect of branch instructions being executed whilst that control information is set.

The unexpected change in instruction flow can be caused by a variety of situations, but in one embodiment is caused by at least one type of exception occurring, and/or by a branch resteer operation occurring.

Hence, for at least certain types of exceptions, the above described techniques can be used to allow relaxation of the recovery point constraint when such exceptions occur. In one particular example, the at least one type of exception comprises a translation abort triggered by the processing circuitry being unable to translate a virtual address specified by a memory access instruction into a valid physical address within memory. Upon occurrence of such a translation abort, an exception can be taken in order to perform an exception routine, for example at the operating system level, to seek to provide the correct translation. Once the correct translation has been obtained, then the processing can be resumed. However, it is not important to the application exactly at which point the code is resumed, and hence at which point its execution state was saved prior to the exception routine being executed, since the exception routine will either provide a correct translation, or the operating system will terminate the context of the application. Accordingly, by relaxing the recovery point constraint, the processing circuitry can decide a suitable recovery point to be used in the event of a translation abort occurring, so that once the processing returns from the exception handling routine used to obtain the correct address translation, execution resumes from that chosen recovery point. This allows certain microarchitectural optimisations to be made by the processing circuitry in order to seek to improve performance and/or reduce power consumption.

In one embodiment, a branch resteer operation is triggered when a target address of a branch instruction within the software is mispredicted. Again, provided that execution is restarted at some point before the branch, then as long as the results will be correct, the exact point at which re-execution begins does not matter. Accordingly, in the presence of the recovery point relaxation condition, the processing circuitry can choose a suitable recovery point to be used should a branch resteer operation be required.

There are a number of micro-architectural enhancements that the processing circuitry may be able to take in the presence of the recovery point relaxation condition. In one embodiment, the processing circuitry is arranged to allow fusing of operations specified by two or more of the instructions executed between each determined execution point for which said execution state is retained. Hence, the processing circuitry can look for operations that may be combined in order to improve performance, the ability to combine these operations being possible due to the need having been removed for retaining execution state between those instructions. It will be appreciated that there are many types of operations which may potentially be fuseable. As an example, the ALU operations of two ALU instructions may be fuseable, so that a single combined ALU operation can be performed within the pipeline to produce the result that would be obtained by executing each of the ALU instructions separately. Further enhancements may also be possible in such situations. For example, it may be that the output of the first ALU operation is only used as a source operand for the second ALU operation, and in that instance there may be no need to separately produce the intermediate result representing the result of the first ALU operation, as there is no need to store that intermediate result in the register file.

In the presence of the recovery point relaxation condition, the processing circuitry has increased flexibility as to which execution points require execution state to be retained, so as to provide a possible recovery point. In one embodiment, the number of instructions executed between each determined execution point for which said execution state is retained comprises instructions forming multiple iterations of a loop within the software. Many systems have accurate branch prediction mechanisms, and accordingly can accurately predict whether a branch will be taken or not taken. By allowing multiple iterations of a loop to be executed in parallel, for example following a prediction that the branch will be taken for each of those iterations, this allows high performance execution of the instructions within those multiple iterations. Such a technique can be particularly beneficial for loops that have a very large number of iterations, since a chosen number of iterations can be performed in parallel, thereby significantly reducing the time taken to perform the required iterations of the loop.

As mentioned earlier, in situations where it is possible to relax the recovery point constraint, this allows the processing circuitry to analyse certain sections of the code so as to seek to make micro-architectural optimisations in order to improve performance and/or energy consumption when executing that code. As one example, the processing circuitry may be able to improve detection of register data lifetime, i.e. detect how long the contents of particular registers will be required, and hence detect when the contents are no longer required. This can enable more efficient use of the register resources, and in out-of-order processors can hence increase the pool of registers available for register renaming at any particular point in time.

If desired, such register data lifetime information can be encoded within the instructions available within the instruction set architecture. For example, in one embodiment the instruction set architecture may provide multiple variants of one or more instructions, including at least one lifetime indicating variant providing a lifetime indication for at least one register identified by that instruction. The control circuitry is then arranged to control operation of the processing circuitry dependent on said lifetime indication.

The lifetime indication derived from a lifetime indicating variant of an instruction can be used in a variety of ways. In one embodiment the processing circuitry may be arranged to use the lifetime indication to perform one or more of: freeing a register for re-use when the lifetime indication indicates that the data value stored in that register is no longer required; determining a forwarding path to employ to forward a result value of a first operation for use as an input to circuitry performing a subsequent operation; preventing storage of a result value to a register when the lifetime indication indicates that no subsequent access to that register to obtain the result value will be required; fusing the operations specified by first and second instructions when a result value produced by execution of the first instruction is only used as an input to the second instruction. It will be appreciated that this is not intended to be an exhaustive list of the actions that a processing circuitry may take, but indicates the type of optimisations that may be made by the processing circuitry based on the lifetime indication information, in order to improve performance and/or reduce power consumption.

The lifetime indicating variants of instructions can take a variety of forms. In one embodiment, they may comprise one or more of: a sink variant of the instruction identifying that at least one source value for the instruction is not required by subsequent instructions; a limited use variant of the instruction providing subsequent use information for at least one value identified by the instruction.

The limited use variant could in principle provide subsequent use information about either a source value or a destination value. For example, in a fine-grained multi-threaded architecture, which may switch between threads at any point in time, the limited use variant could identify that the destination value is intended to be used soon, flagging that the processing circuitry should aim not to switch away to a different thread at that point in time as the destination value is likely to soon be used as a source value for a subsequent instruction within the thread.

Alternatively, the limited use variant of the instruction may provide a more concrete indication as to the expected lifetime of the value. For example, the limited use variant of the instruction may identify a number of subsequent uses for at least one value identified by the instruction. The processing circuitry can then use that information to determine in due course when the value is no longer needed.

In a further embodiment, the instruction set architecture may provide a value kill instruction to identify one or more registers whose stored value is obsolete. Hence, this instruction is provided explicitly to identify registers that can be freed for re-use.

In some embodiments, the above described functionality that enables a recovery point relaxation condition to be detected can be selectively disabled. Hence, when the processing circuitry is executing certain identified sections of code, the control circuitry may be prevented from detecting the recovery point relaxation condition, so as to ensure that the default recovery point constraint is applied when executing such a section of code. Hence, certain sections of code can be identified as being such that the default requirements of the ISA should not be allowed to be circumvented. However, for other sections of code, the above described techniques can be used to allow situations to be detected where the recovery point constraints can be relaxed, in order to allow the processing circuitry to achieve improved performance and/or reduced power consumption when executing the code.

Particular embodiments will now be described with reference to the Figures.

FIG. 1 is a block diagram of an apparatus in accordance with one embodiment. Processing circuitry 10 is provided to execute instructions retrieved from memory 20. The processing circuitry 10 has access to one or more register files 15 containing a plurality of working registers, and some of the instructions executed by the processing circuitry will typically comprise memory access instructions, particularly load or store instructions. Load instructions are used to load data values from memory 20 into the one or more identified registers within the register file 15, whilst store instructions are used to store data values from one or more identified registers to an address in memory 20.

An Instruction Set Architecture (ISA) is associated with the processing circuitry 10, the ISA being a part of the processor that is visible to the programmer or compiler writer developing software to execute on the processing circuitry.

As shown in FIG. 1, control circuitry 25 is provided for controlling the operation of the processing circuitry 10 when executing the instructions retrieved from memory, and the control signals issued to the processing circuitry take into account one or more requirements or constraints 30 specified by the ISA. In particular, the ISA is defined such that any software can be written using the instructions defined by the ISA, and the ISA constraints 30 are intended to ensure that any such software will operate correctly when executed on the processing circuitry 10. However, it is often the case that some of the constraints are only needed in certain situations. Nevertheless, in the absence of the techniques described herein, there was typically no way for software to indicate to the hardware when it actually needed the constraints specified by the ISA.

In accordance with the embodiments described herein, a mechanism is provided that allows the software written to execute on the processing circuitry to provide information that the control circuitry can use to determine when certain ISA constraints can be relaxed. In particular, the ISA constraints 30 will include a default recovery point constraint for determining a recovery point from which to resume instruction execution following handling of an unexpected change in instruction flow, such as may occur when an exception routine is executed following certain faults or interrupts, or when a branch resteer is required, for example following determination that a branch misprediction has taken place. When an exception routine is executed, the processor circuitry needs to determine at which point within the original program flow execution will resume once that exception routine has been completed. Similarly, when performing a branch resteer, the processing circuitry needs to determine where execution should be restarted within the program. The default recovery point constraint places quite stringent constraints on how the recovery point is determined in any particular scenario, and due to the need to support these various recovery points, it is typically the case that the processing circuitry needs to retain execution state for a large number of execution points within the software whilst it is being executed by the processing circuitry. This can significantly restrict the processing circuitry's ability to seek to organise the operations it performs so as to improve performance and/or reduce energy consumption.

However, in accordance with the techniques described herein, the ISA allows the software to provide indications to the control circuitry as to when the default recovery point constraint can be relaxed, and the processing circuitry can then be given enhanced freedom to choose the recovery point from which to resume instruction execution following handling of an unexpected change in instruction flow.

As also shown by the box 35, a control flag can optionally be maintained that can be set to selectively disable the above mentioned functionality. Accordingly, for certain sections of code, the control circuitry can be arranged not to derive any information from the software being executed that might imply that the recovery point constraint can be relaxed, and instead will always apply the default recovery point constraint when such a section of code is being executed. However, once the disable flag is cleared, then the control circuitry can derive information from the software being executed by the processing circuitry with the aim of detecting a recovery point relaxation condition where the default recovery point constraint can be relaxed, and upon detection of such a recovery point relaxation condition, to then send appropriate control signals to the processing circuitry to allow the processing circuitry to seek to make certain micro-architectural optimisations with the aim of increasing performance and/or reducing power consumption.

Figure 2:
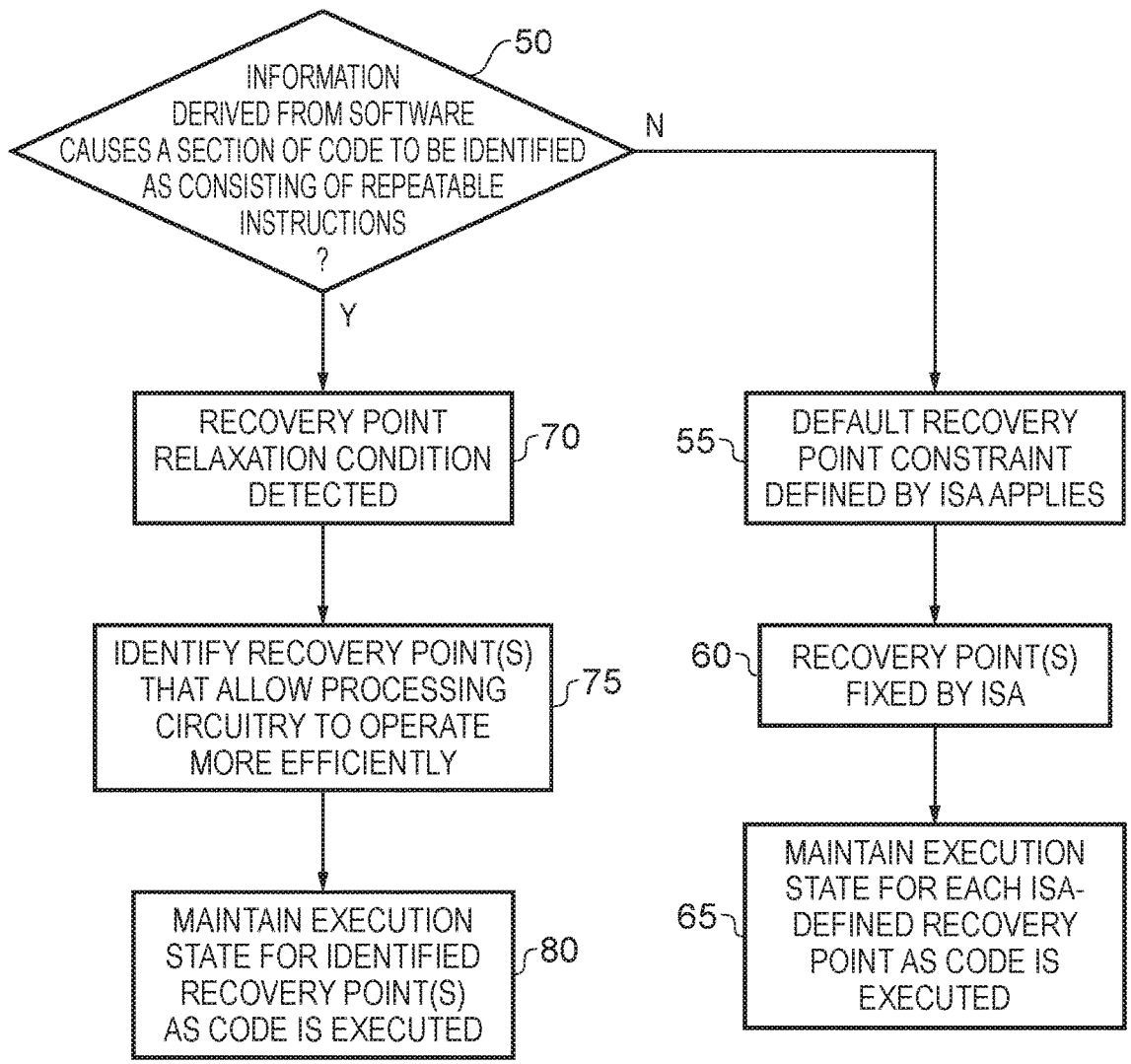
FIG. 2 is a flow diagram illustrating how the control circuitry of FIG. 1 may control the operation of the processing circuitry in order to relax recovery point constraints under certain conditions, in accordance with one embodiment.

FIG. 2 is a flow diagram illustrating steps that can be taken in one embodiment to relax the default recovery point constraint under certain conditions. At step 50, the control circuitry monitors information derived from the software being executed on the processing circuitry in order to determine whether that information indicates that a section of code consists of instructions that are repeatable. Many instructions are by their nature repeatable, but various types of instruction may not be. For instance, it is often the case that load or store instructions have to be assumed to be non-repeatable in known systems. In particular, due to functionalities such as memory aliasing, it may not be possible to guarantee that if a load or a store operation is repeated, the same result will be obtained as the last time that load or store operation was performed. For example, there is a limitation in the popular "C" programming language, which assumes memory aliasing in function parameters. Many compilers have a pragma directive that allows more efficient code generation when it is known that memory aliasing does not exist, and other languages (such a FORTRAN) show improved data processing capabilities by taking advantage of situations where memory aliasing cases are known ahead of time.

To the extent that the compiler or software developer is aware of these cases, the mechanisms described herein enable the software to inform the hardware of situations where there will be no memory aliasing, and hence where the load or store instructions are repeatable.

In the absence of such information being derived by the control circuitry from the software executed on the processing circuitry, the process will proceed to step 55, where the default recovery point constraint defined by the ISA will be applied. At step 60 the recovery points will then be fixed by the ISA, and the processing circuitry will be constrained to retain execution state for any execution point that still has the potential to be used as a recovery point for the instructions being executed by the processing circuitry. In particular, as shown at step 65, the processing circuitry will maintain execution state for each ISA-defined recovery point as the code is executed. It will be apparent that as the results of instructions get committed, and hence it can be determined that certain recovery points are no longer needed, the associated execution state can be deleted or overwritten. Nevertheless, the execution state still needs to be retained until such commit points are reached, and the requirement to retain execution state for many different execution points as the software is executed can significantly impact performance and/or impact power consumption. In particular, due to the need to potentially recover execution to a wide variety of different recovery points, the processing circuitry has limited flexibility to take certain micro-architectural steps that could otherwise improve performance and/or reduce energy consumption, as will be discussed in more detail later.

However, as shown in FIG. 2, if the information derived from the software causes a section of code to be identified as consisting of repeatable instructions, then it is determined that the recovery point relaxation condition has been detected at step 70, and as indicated by step 75 this allows the processing circuitry to have increased flexibility as to the choice of recovery points to be used, and in particular allows the processing circuitry to identify recovery points that will allow the processing circuitry to operate more efficiently.

There are a wide variety of different steps that the processing circuitry could take in the presence of the recovery point relaxation condition, but some examples of micro-architectural optimisations that are possible due to the relaxed recovery point constraint are as follows:

Improved register data lifetime detection;
Improved operation fusion:
Dynamic conversion from sequential code to vector/data-flow/multiple thread code;
Increased extractable parallelism in a superscalar design; and
Decreased storage requirements for out of order execution.

In accordance with the recovery points identified at step 75 having regard to the relaxed recovery point constraints, the processing circuitry is then arranged, at step 80, to maintain execution state only for the identified recovery points as the code is executed. Typically this will mean that in the presence of the recovery point relaxation condition, the processing circuitry can execute an increased number of instructions between each determined execution point for which execution state need to be retained, and hence has enhanced flexibility as to how to improve processing efficiency of the operations required by those instructions.

It should be noted that the techniques described herein can be used in both in-order and out-of-order systems. Similarly the techniques can be used in systems that employ only a single processor (such as a single CPU), or systems that employ multiple processors operating in parallel. The benefits achievable using the described techniques potentially increase in the more complex systems, for example those that employ out-of-order instruction execution techniques.

Figures 3A, 3B:
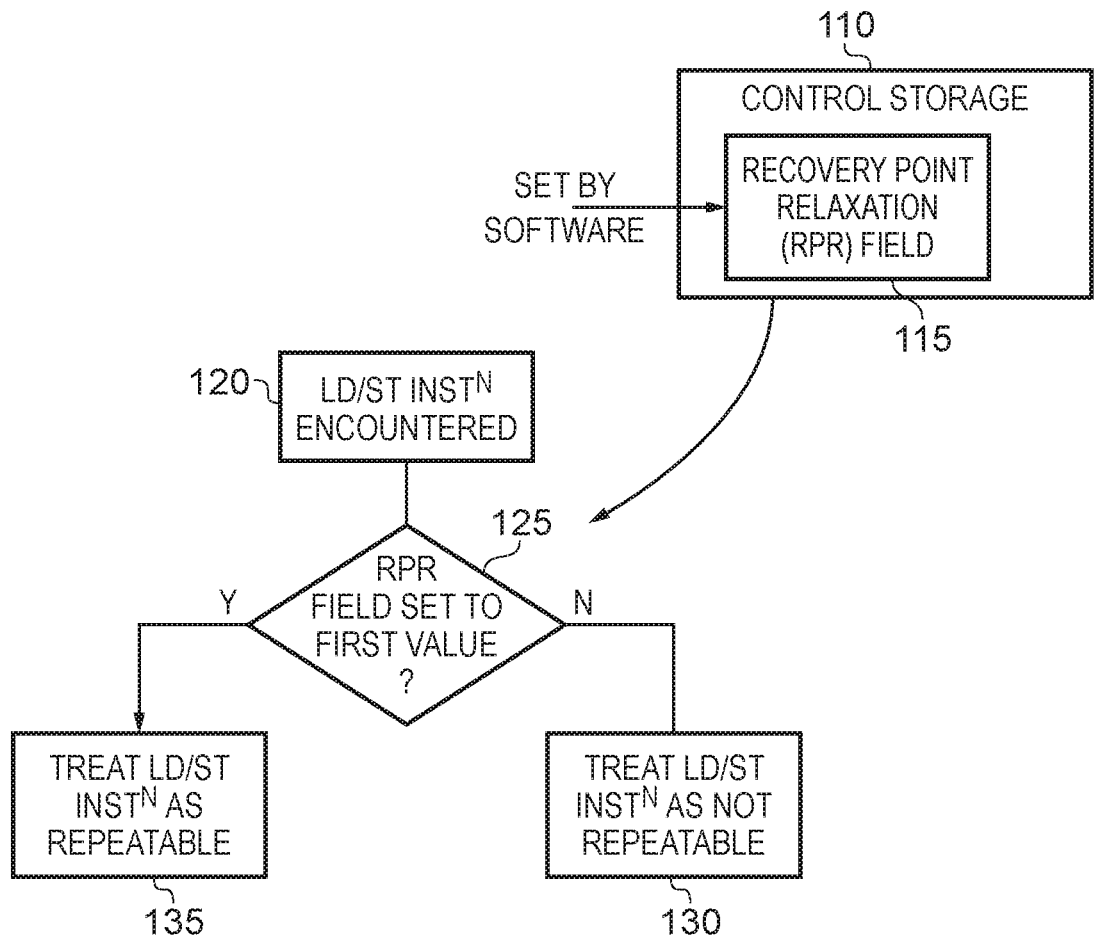
FIGS. 3A to 3C schematically illustrate three different mechanisms that may be employed in accordance with described embodiments to determine situations where memory access instructions are considered repeatable.

There are a number of mechanisms that can be used to enable the software to identify when load or store instructions are repeatable. For example, as shown in FIG. 3A, in addition to standard load/store instructions 100, "repeatable" variants of those load and store instructions 105 can also be provided. Hence, in accordance with this approach, the instruction set is expanded to include repeatable variants of certain load and store instructions, in one embodiment repeatable variants being provided for at least the most commonly used load and store instructions. This can for example be done by providing a modified opcode to identify the load or store instruction as a repeatable variant.

As an alternative, as illustrated in FIG. 3B the processing circuitry 10 and associated control circuitry 25 may have access to control storage 110 which can include a number of control fields settable by software, including a recovery point relaxation (RPR) field 115. The software can hence set that field to a first value to identify when the recovery point relaxation condition is present, and can clear it to a second value to identify when the recovery point relaxation condition is not present.

As indicated by the flow diagram in FIG. 3B, when a load or a store instruction is encountered at step 120 by the processing circuitry during execution of the software, it can be determined at step 125 whether the RPR field has been set to the first value. If not, then at step 130 the load or store instruction is treated as not repeatable, and the default recovery point constraint will be applied. However, if the RPR field is set to the first value, then as indicated by step 135, the load or store instruction is treated as repeatable. This may then enable the control circuitry to identify a section of code consisting of repeatable instructions, and hence allow the relaxed recovery point determination to be made by the processing circuitry in respect of that section of code. This in turn can allow the processing circuitry to adjust certain micro-architectural features so as to seek to optimise performance and/or energy consumption when executing that section of code.

Figure 3C:
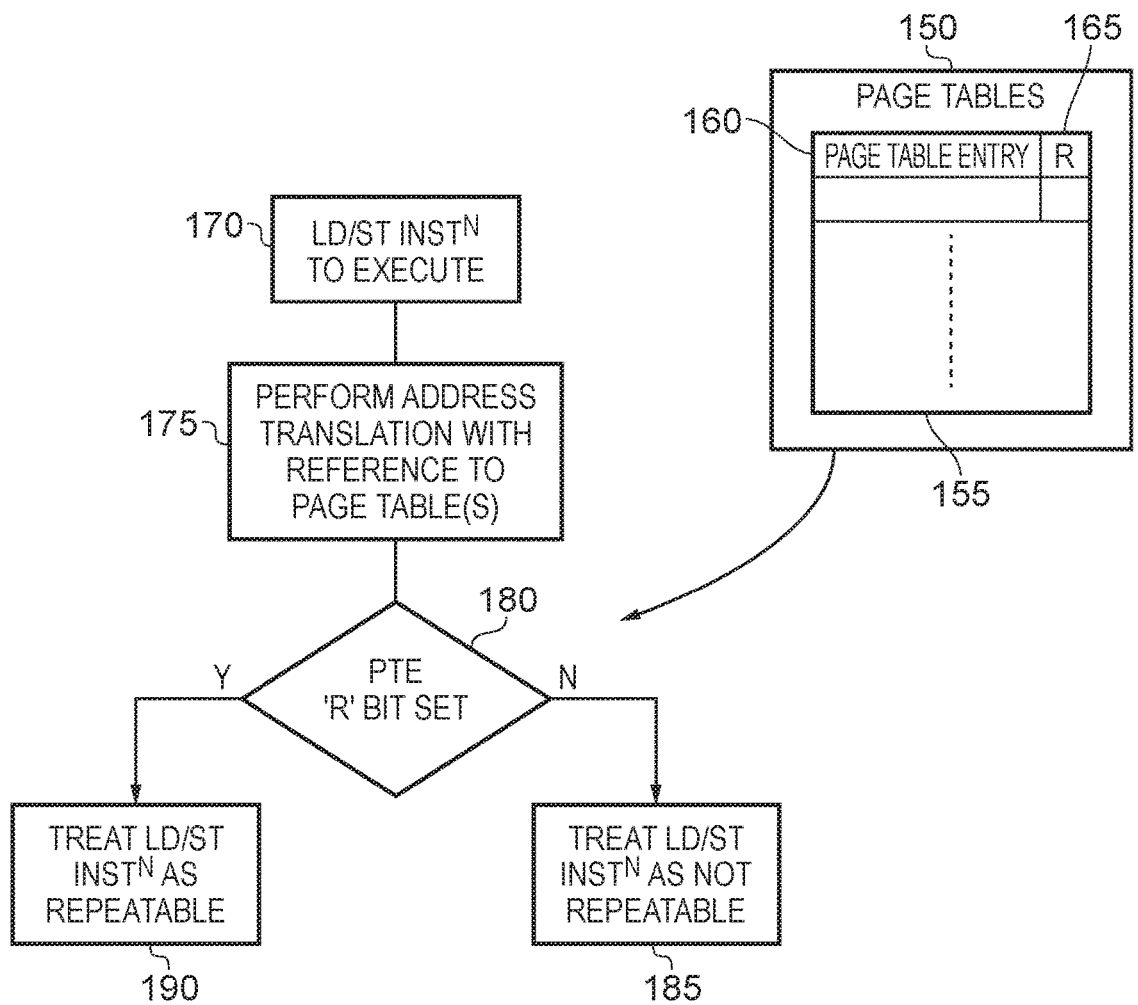

In most modern data processing systems, a virtual addressing scheme is used. Hence, each memory access instruction executed within the program will typically specify a virtual address, and the processing circuitry is arranged on executing the instruction to perform an address translation operation with reference to one or more page tables in memory in order to identify, for the specified virtual address, a corresponding physical address to be accessed in memory. As shown by FIG. 3C, in one embodiment an extra field can be added in association with the page table entries, which can be set to identify whether a region of physical memory associated with that page table entry is repeatable or not, i.e. whether load or store instructions that access that region of memory can be considered to be repeatable.

Hence, as shown in FIG. 3C, a number of page tables 150 may be provided in memory, and one or more of those page tables 155 can have a repeatable field R 165 provided in association with each page table entry 160. When during the address translation process such a page table entry is used to determine a physical address, the repeatable field 165 can be analysed in order to determine whether the associated load or store instruction should be considered repeatable.

This is indicated by the flow diagram in FIG. 3C, where at step 170 a load or store instruction is to be executed by the processing circuitry. Accordingly, at step 175, an address translation process is performed with reference to one or more page table 150. As part of performing the address translation process, it will be determined at step 180 whether the page table entry R bit is set. If not, then the load or store instruction is treated as not repeatable at step 185, whereas if the R bit is set the load or store instruction is treated as repeatable at step 190.

FIG. 4A illustrates an example sequence of program instructions, including a load instruction C and a store instruction E. In accordance with the default recovery point constraint specified by the ISA, it is assumed that the execution point of each of the instructions shown has the potential to be a recovery point under certain conditions, and accordingly during execution of those instructions the execution state for each indicated potential recovery point will be retained until it can be determined that that recovery point is no longer required. In certain situations, it may be that not all of the execution points associated with each individual instruction have the potential to be used as recovery points, but it will typically be necessary for at least each instruction that could cause an unexpected change in instruction flow to have its execution state retained for use as a possible recovery point. This will include at least the load and store instructions shown, but also could include other instructions such as branch instructions where a misprediction may take place, or any instructions that could be associated with trapped operation errors (such as divide by 0, arithmetic over/under flow), etc. Execution state may also need to be retained in order to be able to deal with external interrupts that do not appear in the code sequence, but which may potentially require recovery at any arbitrary point within the instruction flow.

FIG. 4B illustrates how for the same example sequence of instructions, a single recovery point may be set when the recovery point relaxation condition is determined to be present. It should be noted that in other examples it may be decided by the processing circuitry to provide multiple recovery points, but typically the number of potential recovery points will be reduced relative to the number required when applying the default recovery point constraint.

Figure 4C:
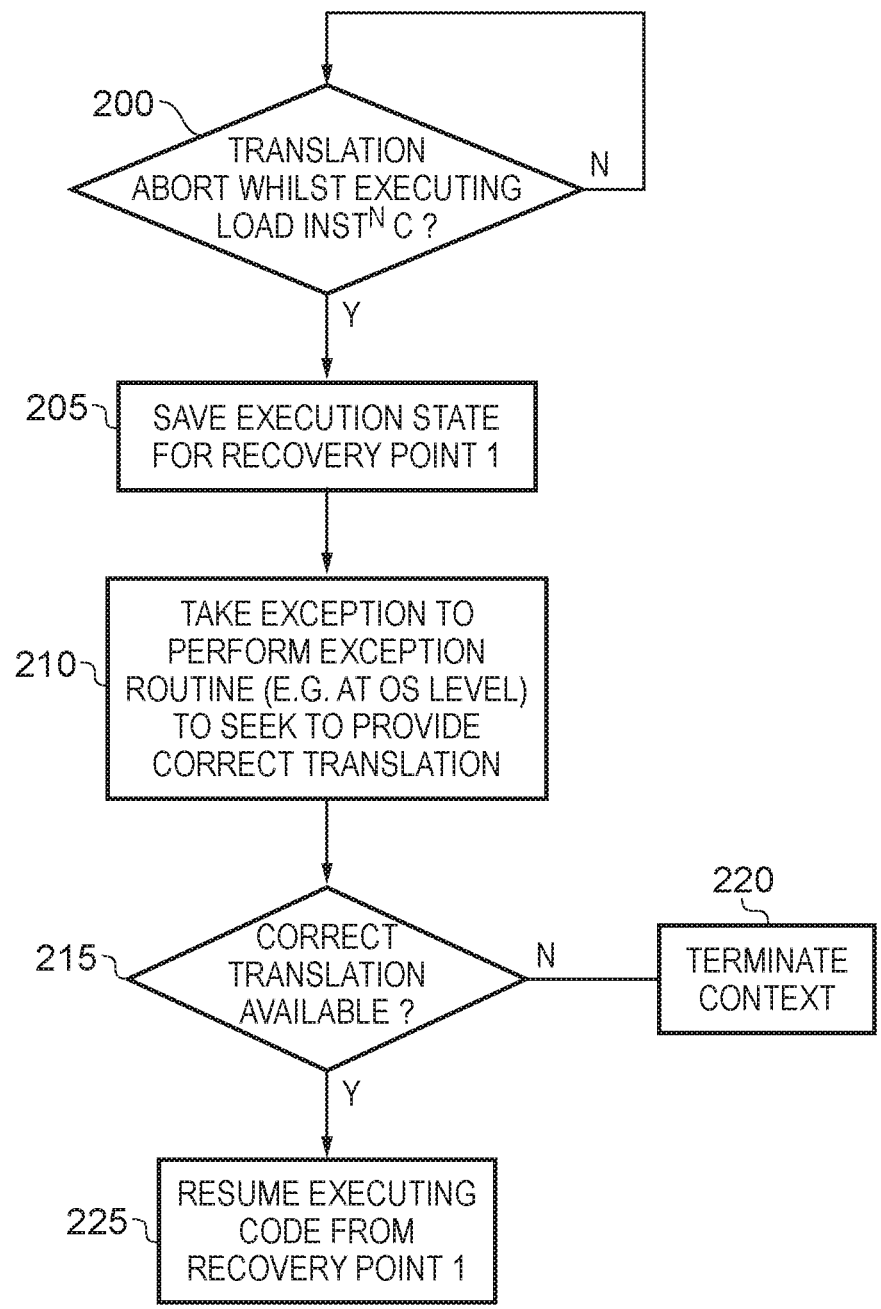
FIG. 4C illustrates how a translation abort is handled in accordance with the relaxed recovery point constraint of FIG. 4B in accordance with one embodiment.

As mentioned earlier, it is typically the case that an address translation process will be performed when executing each load or store instruction, in order to convert a virtual address into a physical address. FIG. 4C is a flow diagram illustrating the process that may be performed if a translation abort is detected whilst executing the load instruction C, i.e. where it is determined that the current page tables do not allow a valid physical address to be determined for the specified virtual address. The same process would typically be applied when executing the store instruction E shown in FIG. 4B.

In particular, as shown in FIG. 4C, at step 200, if a translation abort occurs whilst executing the load instruction, then at step 205 the execution state associated with recovery point 1 is saved prior to taking an exception. This means that once the exception has subsequently been handled, processing will resume with execution of instruction A. Typically, in accordance with the default recovery point constraint, the execution state associated with recovery point 3 would need to be saved, so that the execution resumes at exactly the point where the translation abort occurred. However, since in the presence of the recovery point relaxation condition it is known that the load instruction is repeatable, the application does not actually care about the exact point at which its execution state is saved, since it can be restarted at any point prior to the load instruction, provided that point is within a section of the code that has been marked as repeatable.

At step 210, an exception is taken to perform an exception routine in order to seek to provide the correct translation. Typically this exception routine will be executed at the operating system level, and will result in the operating system updating the relevant page table to provide the correct translation, or otherwise terminating the process/context making the request. Accordingly, at step 215, it will be determined whether the correct translation is available, and if not the context will be terminated at step 220. However, assuming the correct translation is now available by virtue of the operating system updating the page table, then the process will proceed to step 225 where execution of the code will be resumed from the recovery point 1 shown in FIG. 4B. If the relaxed recovery point requirement were not in effect, an example ISA might require a recovery point immediately prior to INSTN C be saved and used for code resumption.

Since the sequence of instructions shown in FIG. 4B are repeatable, correct operation can still be ensured even though the process resumes from recovery point 1. Further, by avoiding the need to maintain execution state for each of the various recovery points shown in FIG. 4A, and instead allowing a restore to an earlier point, this can allow improved efficiency of the processing circuitry. As an example, it may allow for better register usage, and may allow for fusing of certain operations, such as the operations associated with instructions B and D in some instances, etc.

Figure 5A:
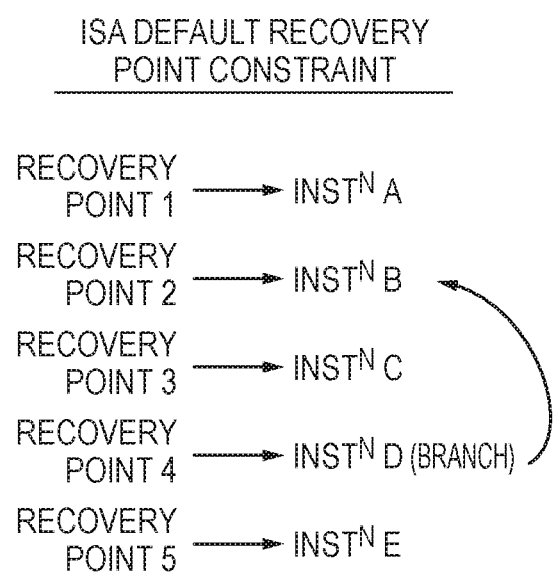
FIGS. 5A and 5B illustrate a default recovery point constraint and a relaxed recovery point constraint for another example sequence of code including a branch instruction.
Figure 5B:
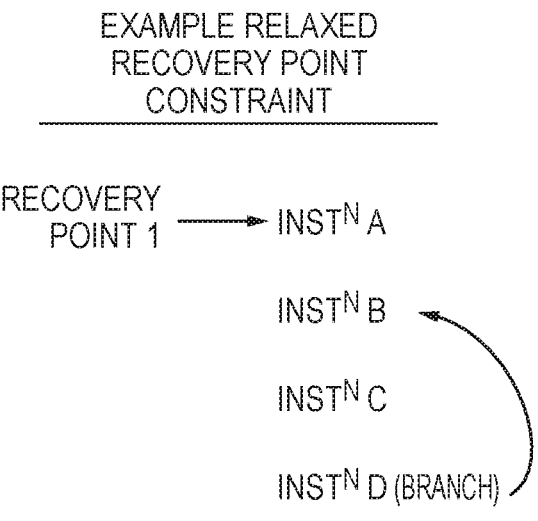
Figure 5C:
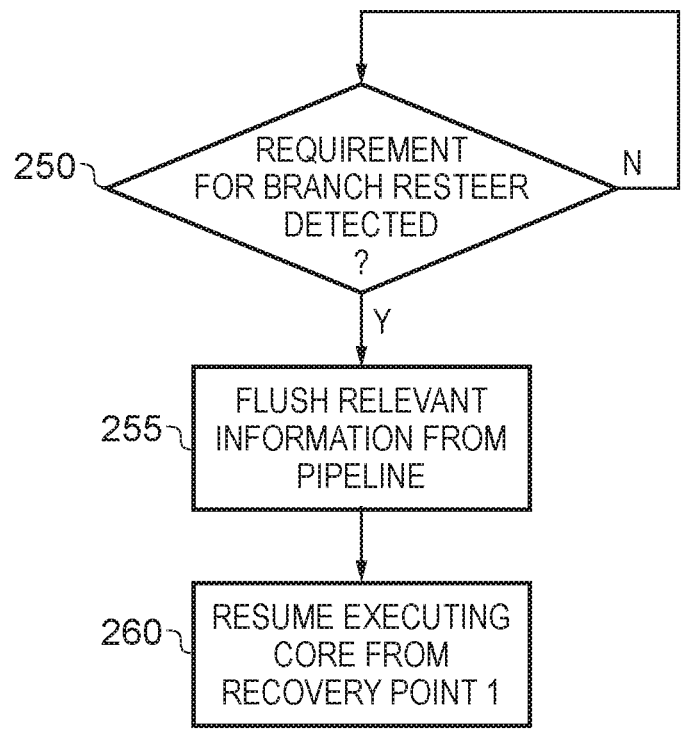
FIG. 5C is a flow diagram illustrating how a branch resteer is implemented in situations where the relaxed recovery point constraint exists, in accordance with one embodiment.

FIGS. 5A to 5C illustrate how an example sequence of instructions including a branch instruction can be handled in the presence of the recovery point relaxation condition. FIG. 5A shows how, in accordance with the ISA default recovery point constraint, a recovery point may need to be associated with each of the instructions being executed, whilst in FIG. 5B it is assumed that in accordance with the relaxed recovery point constraint it is only necessary to keep execution state associated with recovery point 1.

Assuming accurate branch prediction can be made, it may be that multiple loops of the instructions B, C and D can be performed in parallel, due to the relaxation in the recovery point constraint that does not require execution state to be retained at any point within the body of the loop. If at some point it is determined that the branch prediction is wrong for a particular iteration, then it will be necessary to return to the last recovery point maintained.

FIG. 5C illustrates an example of the processing flow that occurs if a branch resteer condition is detected. In particular, if a need for a branch resteer is detected at step 250, for example due to a branch misprediction for instruction D, then the relevant information is flushed from the pipeline at step 255 (i.e. information relating to instructions that no longer need executing), whereafter execution is resumed from recovery point 1 at step 260.

For loops having a large number of iterations, the processor may determine, for example, that the execution state only needs to be retained for every nth iteration of the loop, hence allowing the operations required by multiple loops to be grouped together so that they can be executed more efficiently. Hence, by being able to resume operation from an arbitrary point before the branch, it is possible to avoid saving more state than would otherwise be required, and for loops with a large number of iterations, for example "do process X a thousand times", the hardware can attempt to group operations from multiple loops together so that they can be executed more efficiently, and then go back to a checkpoint to execute the end of the loop.

For instance, if the loop is
for(i=0; i<e; i++)
　c[i]=a[i]+b[i]
The processor could predict that e>>4, and attempt to execute the code as a vector operation to execute it 4 times as fast, the sequence hence becoming:
for (i=0; i<e; i+4)
　c[i,i+1,i+2,i+3]=a[i,i+1,i+2,i+3]+b[i,i+1,i+2,i+3]

In accordance with the modified processing performed by the hardware, the processing circuitry can then save the state at the start of every four iterations of the original loop, and if the loop terminates, or it predicted incorrectly, the processing circuitry can then go back to the last saved checkpoint and re-execute the code to re-calculate the correct result just for the last few iterations before the termination, or before the misprediction was detected. This can give rise to significantly increased performance by enabling the processing circuitry to unroll loops in order to allow multiple iterations to be performed more efficiently.

The processing circuitry will typically include address hazard checking circuitry for detecting memory dependencies, also referred to as address hazards, between instructions being executed by the processing circuitry, so that steps can be taken to avoid such address hazards. Such hazards can occur in in-order processors, if for example two operations with an associated address hazard are both in-flight at different stages within the processing pipeline. However, address hazard checking becomes even more significant in out-of-order systems where the processing circuitry can re-order the execution of instructions with the aim of seeking to improve performance. Due to the potential for re-ordering, a number of different memory dependencies can arise, and techniques need to be employed to deal with such memory dependencies.

Memory dependencies can consist of the following types:
Read-after-write (RAW) dependencies: RAW dependencies arise when a load operation reads a value from memory that was produced by the most recent preceding store operation to that same address.
Write-after-read (WAR) dependencies: WAR dependencies arise when a store operation writes a value to memory that a preceding load operation reads.
Write-after-write (WAW) dependencies: WAW dependencies arise when two store operations write values to the same memory address.

In high-performance out-of-order execution processors that allow memory access instructions such as loads and stores to be executed out of program order, memory disambiguation mechanisms are typically implemented in hardware to resolve ambiguous dependencies and enable recovery when a dependence was violated. Ambiguous dependencies can arise because the location of the operand for a load or store instruction may be indirectly specified as a register operand rather than directly specified in the instruction encoding itself, and hence any memory dependencies are not static, and cannot be determined prior to execution. A number of different memory disambiguation mechanisms can be used, including for example the use of a store queue to buffer the memory address and associated stored data of a store operation until the associated store instruction is retired from the pipeline.

However, when a section of code can be identified where it is known that the load and store instructions are repeatable, it is no longer necessary to perform the address hazard checking for the addresses to be accessed by those multiple load or store operations. This can allow significant performance and/or power consumption benefits to be achieved.

Figure 6:
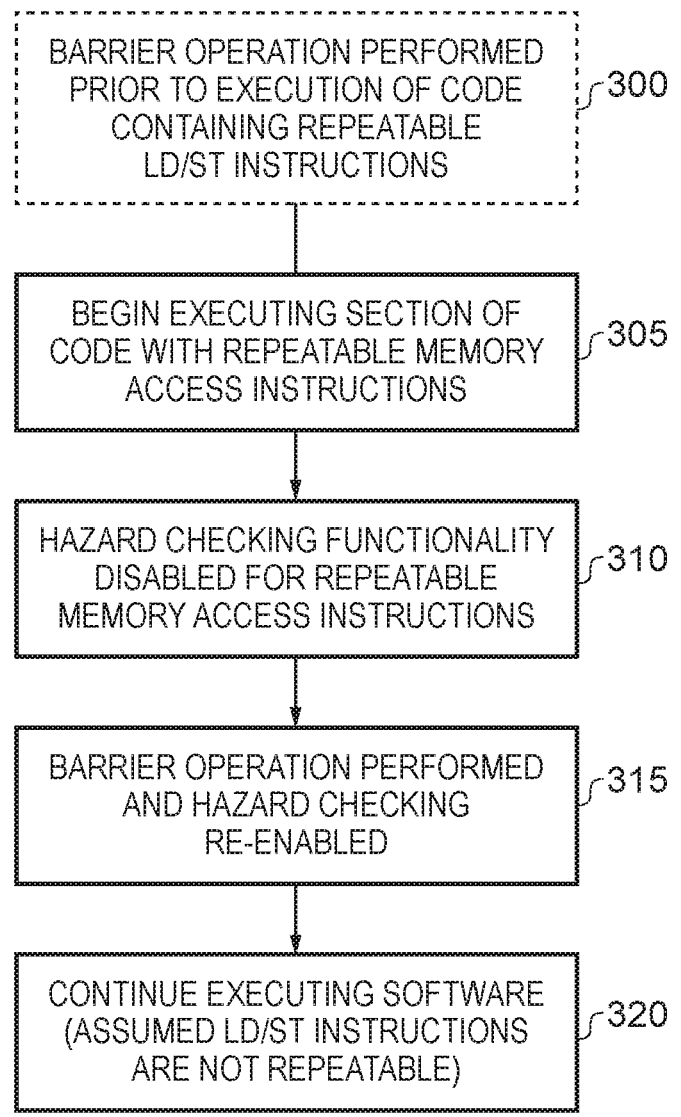
FIG. 6 illustrates how barrier operations are used in one embodiment for identifying sections of code within which hazard checking functionality may be disabled, in accordance with one embodiment.

FIG. 6 is a flow diagram illustrating how barrier operations can be used to delimit sections of code within which the address hazard checking can be turned off. As shown as step 300, optionally a barrier operation may be performed prior to execution of a section of code containing repeatable load or store instructions. As will be appreciated by those skilled in the art, a barrier operation implements a form of synchronisation, to ensure that all instructions occurring prior to the barrier operation are completed before continuing execution. With regards to load or store operations, this will mean that any outstanding memory transactions as a result of those load and store instructions are performed, and as a result any internal buffers within the processing circuitry that store pending load or store operations will be flushed during performance of the barrier operations. In an out-of-order system the barrier can be used to guarantee that the result will be the same as if all operations before the barrier completed before any operations after the barrier, but the system may use the earlier-mentioned address hazard handling circuitry to determine cases where it can allow the operations to be processed in different orders where it will not affect the outcome.

Whilst performing a barrier operation at step 300 is optional, it can be useful to ensure that the optimisation of any repeatable memory accesses within the upcoming section of code is delayed until the appropriate portion of memory is allocated for that section of code to work on.

At step 305, the processing circuitry begins to execute the section of code that includes repeatable memory access instructions. As indicated by step 310, hazard checking functionality is disabled for the repeatable memory access instructions during performance of the operations required by the section of code.

Following execution of the section of code, a barrier operation is performed at step 315 to ensure that all of the pending load and store operations are completed, and the contents of the memory system updated accordingly, and at this point hazard checking is re-enabled. Thereafter, when continuing to execute the software at step 320, it is in one embodiment assumed that the subsequent load and store instructions are not repeatable, and accordingly hazard checking is performed in the standard manner when executing those load and store instructions.

In an alternative embodiment, the barrier operation can also be used to enforce the hazard checking mechanism between any repeatable operations that are on opposite sides of the barrier, thereby allowing software to separate different sections of code that may not be repeatable with respect to each other, but where within each section the instructions are repeatable. This may for example be used as follows:

for(i=0; i<e; i++)
c[i]=a[i]+b[i] (c, a, and b known not to overlap)
barrier
for(i=0; i<e; i++)
a[i]=c[i]/b[i] (c, a, and b known not to overlap)

Figure 7:
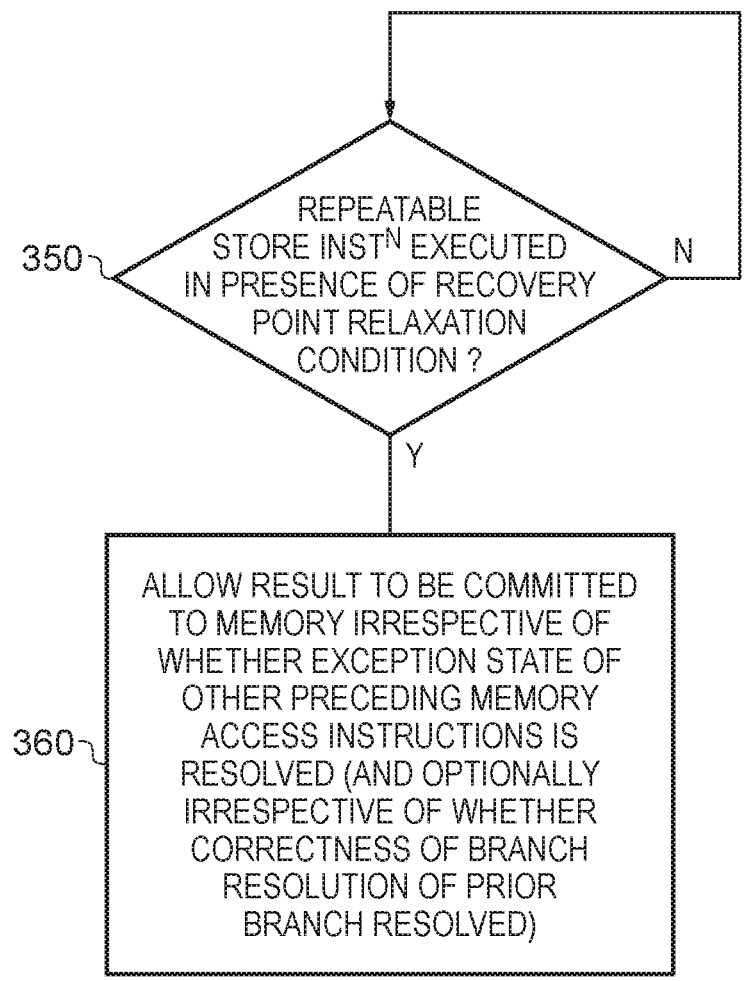
FIG. 7 is a flow diagram illustrating how a repeatable store instruction may be processed in accordance with one embodiment.

FIG. 7 is a flow diagram illustrating additional enhancements that are available when processing repeatable store instructions in accordance with one embodiment. In particular, if at step 350 it is determined that a repeatable store instruction is to be executed in the presence of the recovery point relaxation condition, then at step 360 the processing circuitry may allow the result of the store instruction to be committed to memory, irrespective of whether the exception state of other preceding memory access instructions is resolved. With reference to the earlier-mentioned store queue that may be used in out-of-order processors as part of the memory disambiguation hardware, this means that that store data can be released from the store queue earlier than would otherwise be the case, thereby reducing the utilisation of the store queue.

In addition, if desired, the processor may allow the result of the store operation to be committed to memory irrespective of whether the correctness of branch resolution of a prior branch has been resolved. In accordance with the default recovery point constraint of the ISA, it would typically be necessary to keep execution state in association with a branch instruction in order to allow that execution point to be used as a recovery point if it is determined, when the branch is resolved, that there has been an earlier branch misprediction in respect of that branch. However, by relaxing the recovery point constraint in the presence of the recovery point relaxation condition, the processing circuitry may determine that this is no longer required, and will allow instructions beyond the branch to be executed, and their results committed, before branch resolution of the branch is available.

In one embodiment, this behaviour may be available for any branch instruction being executed by the processing circuitry. Alternatively, individual branch instructions can be flagged so as to identify that they are branch instructions that allow subsequent store instructions to have their results committed to memory even prior to branch resolution of that branch. There are a number of ways in which such a branch instruction may be flagged, but in one embodiment there may be a non-inhibiting variant of the branch instruction that the processing circuitry treats as allowing the committing of results of later store instructions.

Figure 8:
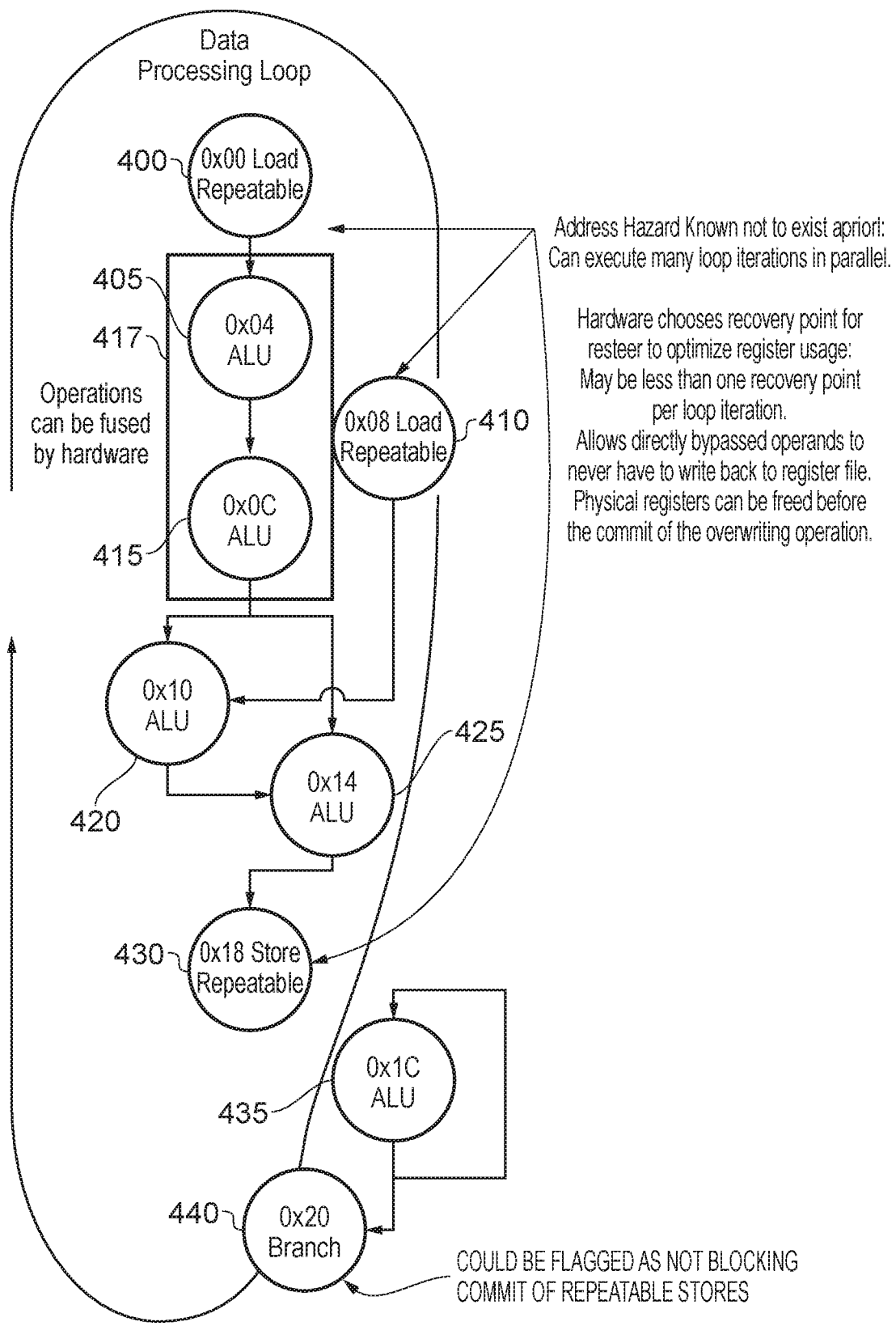
FIG. 8 schematically illustrates a sequence of instructions forming a data processing loop, to which the techniques of the described embodiments may be applied.

FIG. 8 is a flow diagram illustrating the data flow associated with the execution of a sequence of instructions 400, 405, 410, 415, 420, 425, 430, 435, 440, provided within a data processing loop.

As shown, the two load instructions, 400, 410 and the store instruction 430 are marked as repeatable. Further, the ALU instructions and branch instruction are by their nature repeatable. Accordingly, FIG. 8 shows a section of code that can be considered by the processing circuitry to be repeatable, hence indicating that the recovery point relaxation condition is met for that section of code. Since address hazards are known not to exist apriori, the processing circuitry can decide to execute many loop iterations of the data processing loop shown in FIG. 8 in parallel. The processing hardware can choose the recovery point to be used in the event of the need for a branch re-steer, so as to seek to obtain certain micro-architectural efficiency benefits, for example by seeking to optimise register usage. If desired, there can be less than one recovery point per loop iteration. Whilst this will mean that in the event of a branch re-steer being necessary, it may be necessary to repeat a number of loop iterations, this may be more than offset by the potential performance benefits realised from executing multiple loops in parallel.

By relaxing the recovery point constraints, and hence increasing the number of instructions that can be executed between each execution point for which execution state needs to be retained, the processing circuit can also more effectively determine factors such as data lifetime. This can allow more efficient use of bypass paths between different execution units, and in some instances can result in certain result values not needing to be written back to the register file at all, for example when it is known that the output value will only be used once, and will be used by another execution unit that can receive that data value via a forwarding path. Also, certain operations can be fused in order to seek to improve performance. For example, as shown by the box 417, the operations required by the two ALU instructions 405, 415, can be fused together. This is possible due to the fact that the intervening load instruction 410 is marked as repeatable, and accordingly execution state does not need to be retained in association with the load instruction 410.

Considering the store instruction 430, as will be apparent from the earlier discussion of FIG. 7, the result of this store operation can be committed before it is known if execution of any of the preceding instructions could give rise to an exception, and hence the store result can be committed before the preceding load operations are resolved.

Further, as discussed earlier with reference to FIG. 7, the branch instruction 440 will be inherently repeatable, and can if desired be arranged so as not to block commit of the preceding store instruction 430 whilst awaiting resolution of the branch.

As also noted in FIG. 8, based on the data lifetime analysis, it may be possible to free physical registers early, allowing those registers to be available for subsequent register remapping operations. For example, when it is determined that the results do not need to be written back to the register file, then the associated physical register can be freed before the operation that would overwrite the results of that register is committed, since it is known that the register will not be written to in any event.

The above described measures, either used alone or in combination, can give rise to significant performance and/or power consumption benefits.

Figure 9:
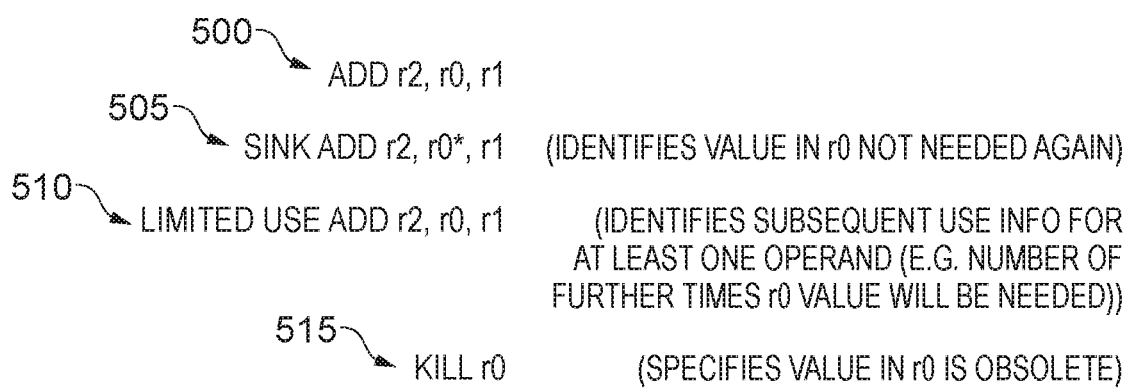
FIG. 9 schematically illustrates various instructions that may be added to the instruction set architecture to provide data lifetime indications in accordance with one embodiment.

Whilst as mentioned earlier the identification of a section of code as repeatable may allow the processing circuitry to analyse more effectively data lifetime requirements of particular values, if desired some additional techniques can be used to more explicitly provide data lifetime information. The compiler/optimiser is often well aware of the lifetime of a value, and in one embodiment the instruction set is supplemented to allow the software to embed within the instruction stream such lifetime information. FIG. 9 gives an example of some additional instructions that may be provided.

In particular, the add instruction 500 is a standard add instruction, where the contents of registers r0 and r1 are added together, with the result being stored in the destination register r2. The instructions 505, 510 illustrate variants of the add instruction that may be provided in one embodiment. In particular, the sink add instruction identifies at least one of the source operands as not being needed again. Accordingly, it is known that when the contents of r0 are read as a source operand for the sink add instruction, those current contents of register r0 will not be needed again.

The limited use add instruction 510 is an alternative variant where the instruction provides some form of use information for at least one of the operands, for example the number of further times a particular operand value will be needed. In principle, the information provided in the limited use add instruction can relate to one or more of the source operands or the destination operand. Whilst in one embodiment the limited use add variant could provide a direct indication of the extent to which one or more of the operands will be needed again, it can in an alternative embodiment provide a more indirect indication. For example, in a fine-grained multi-threaded architecture, where switching between the threads can occur at any time, the limited use add instruction could be used to flag that one or more of the operands will be used by a further instruction within the thread appearing relatively shortly after the current instruction, to provide an indication that the processing circuitry should aim not to switch to a different thread before the operand is reused.

Whilst the sink and limited use variants are shown in respect of an add instruction, it will be appreciated that they can be used in association with a variety of the instructions within the ISA to allow data lifetime information to be encoded within the instructions, so as to allow the software to advise the hardware of knowledge about the usage of certain operand values.

As also shown in FIG. 9, if desired an explicit kill instruction 515 can be provided, to specify one or more registers whose value are obsolete.

The provision of such data lifetime information can provide significant benefits. In particular, without it, a value must be stored in a register until an instruction replacing the value in the register is committed (guaranteed not to be flushed). This means that the earliest the hardware can determine that a value is not needed is often long after the point that that value was last used, which can result in several inefficiencies in the design of a superscalar processor. For example, physical registers may need to be allocated longer than necessary, resulting in more registers being needed. Further, such processors typically provide a number of bypass paths for forwarding instruction results to other execution units, but without the data lifetime information it can be difficult to determine exactly which forwarding paths are needed, which can result in extra energy spent in transmitting the result over multiple forwarding paths. Further, the value may be written into the register file even if it was successfully provided over a forwarding path, and is never required to be read again. As another example, opportunities for fusing operations may be missed because the intermediate values have to be preserved unnecessarily, since it is not known whether they will be needed again. Further, without such data lifetime information, the use of intricate threading techniques such as nano-threading is essentially infeasible.

However, by using instructions of the type provided in FIG. 9 to provide enhanced information about data lifetime, it is possible for the processing circuitry to reduce such inefficiencies, for example allowing better register usage, increasing the opportunities for fusing operations, and increasing opportunities for performing more complex threading techniques to seek to improve performance.

Figure 10:
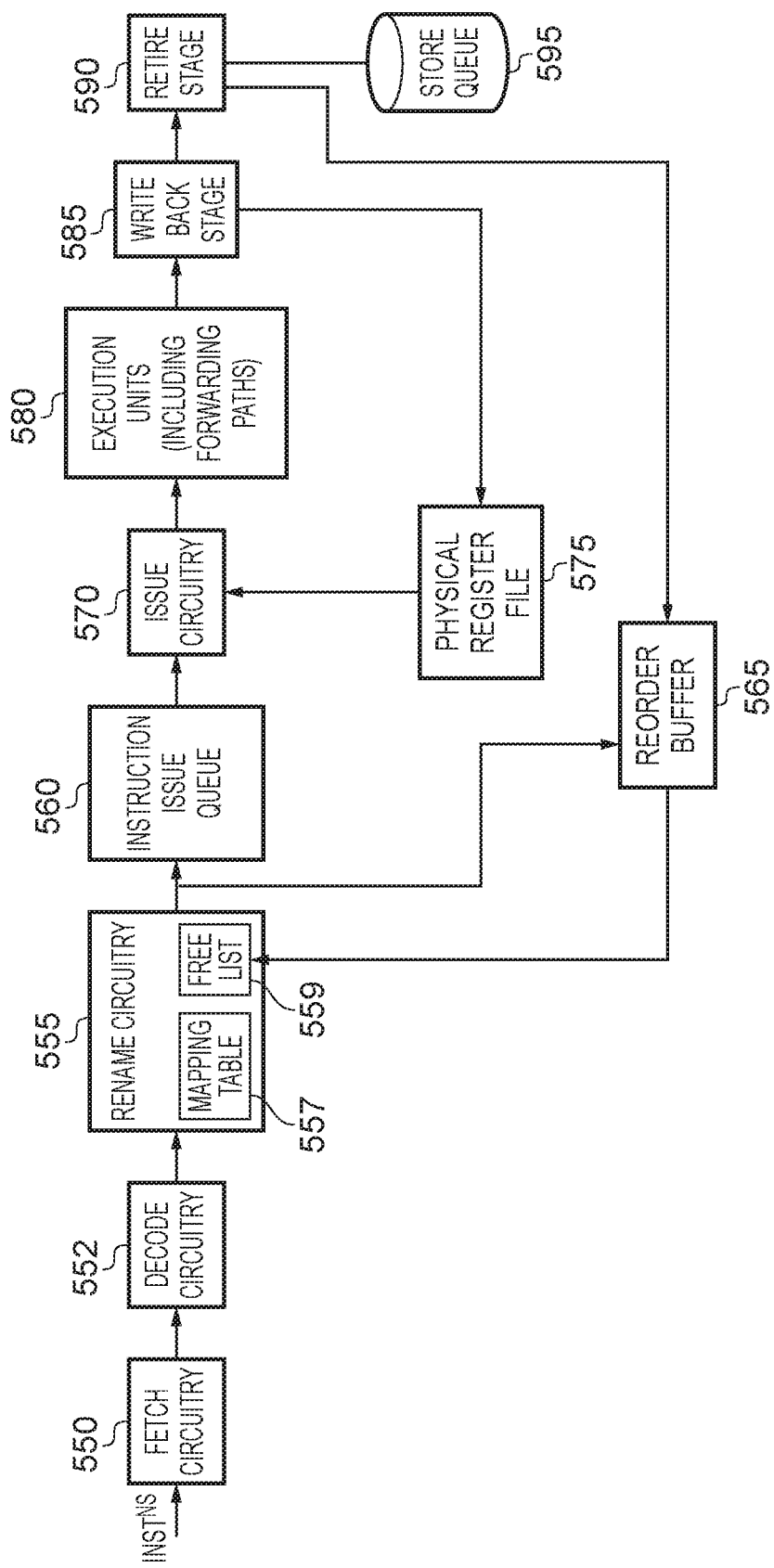
FIG. 10 is a block diagram illustrating an out-of-order processor in which the techniques of the described embodiments may be applied.

FIG. 10 is a block diagram schematically illustrating an out-of-order processing pipeline within which performance and/or power consumption benefits may be realised when executing sections of code in the presence of the recovery point relaxation condition. Fetch circuitry 550 is used to fetch instructions from memory. When determining the order in which instructions are fetched, the fetch circuitry may have access to branch prediction circuitry which can predict, for fetched branch instructions, whether those instructions will be taken or not taken, with the fetch circuitry acting accordingly when determining subsequent instructions to be fetched from memory.

The fetched instructions are decoded by decode circuitry 552, prior to routing via rename circuitry 555 before the decoded instructions are placed within the instruction issue queue 560.

The general operation of rename circuitry within out-of-order processors will be well understood by those of ordinary skill in the art. The rename circuitry serves to map the architectural registers specified by an instruction as source and destination registers to corresponding buffer entries within a result buffer. The result buffer can take a variety of forms, for example a result queue or a physical register file. In the example illustrated in FIG. 10, the result buffer takes the form of the physical register file 575, the physical register file containing a plurality of physical registers, where the number of physical registers exceeds the number of architectural registers specifiable by the instructions. A free list 559 identifies available physical registers within the physical register file 575 that the rename circuitry can allocate during the rename operation. A mapping table 557 is provided identifying, for each architectural register, a physical register currently mapped to that architectural register.

For an architectural register specifying a source operand, the mapping table is used to identify the appropriate physical register from which to obtain that source operand. For an architectural registers specified as a destination register, then typically the rename circuitry will allocate a new physical register for that destination register, so that in the event that there are multiple pending instructions that are seeking to write their results to the same architectural register, those multiple pending instructions are each allocated a different physical register in which to write their results. This enables certain false dependencies to be removed, thereby freeing up the out-of-order processor to re-order the execution of those instructions.

Following the rename process, the decoded instructions are routed to the instruction issue queue 560, and may also allocated an entry within the re-order buffer 565. As will be understood by those of ordinary skill in the art, the re-order buffer is essentially a FIFO structure that maintains certain information about the out-of-order instructions until those instructions reach the retire stage. In particular, for each instruction in the re-order buffer, some information is retained about the previous physical register allocated for the destination architectural register. Once an instruction retires, then the entry in the re-order buffer can be removed, and the physical register file information returned to the free list.

The issue circuitry 570 is responsible for issuing instructions from the instruction issue queue 560 to the appropriate execution units 580. As will be appreciated by those skilled in the art, there may be multiple separate execution units within the box 580, including one or more arithmetic logic units (ALUs), floating-point units (FPUs), load/store units, etc. Further, there may be various forwarding paths for forwarding the outputs from certain execution units to the inputs of other execution units to reduce the number of read and write operations required to the physical register file 575.

For instructions within the instruction issue queue 560, the issue circuitry 570 needs to ensure that there are no true dependencies preventing an instruction from issuance, and the issue circuitry 570 can select any of the instructions in the instruction issue queue that do not have any remaining true dependencies. In one embodiment, the true dependency that is monitored is a RAW dependency, and each entry in the instruction issue queue 560 maintains a flag for each of its source operands which is set to identify when the associated source operand is available. Accordingly, for any instructions within the instruction issue queue 560 whose source operands are identified as available, the issue circuitry 570 can select those instructions for execution.

Once an instruction is selected for issue by the issue circuitry 570, the required source operand data will be read from the physical register file 575, and the instruction passed to the appropriate execution unit 580. At that stage, certain information may also be returned to the instruction issue queue 560 to enable certain dependency data to be updated therein.

The instructions will be executed within the execution units 580, and at the writeback stage 585 this may result in the result data being written to the destination physical register within the physical register file 575. When the instructions are retired at the retire stage 590, then as discussed earlier the corresponding entry in the re-order buffer can be removed, and the relevant physical register file information returned to the free list 559.

As shown in FIG. 10, a store queue 595 can be used to store the address and associated store data of executed store instructions until it is determined at the retire stage that it is safe to commit those results to memory, whereupon the data can be output from the store queue to initiate storage of the data to the appropriate memory address in memory (the data may be buffered on its way to memory in accordance with standard known techniques). Once the data has been output from the store queue 595, the store instruction is considered to have been retired.

As mentioned earlier, in the presence of the recovery point relaxation condition, it is known that there are no address hazards associated with a memory access instruction being executed in the corresponding section of code. This can allow the processing circuitry to reduce utilisation of the renaming process, and the use of the re-order buffer 565. In particular, false hazards such as WAR and WAW hazards that are managed using the rename process are known not to exist apriori. Further, the use of the re-order buffer can be reduced due to the fact that the intermediate renaming states may not need to be stored. For example, if architectural register r5 is written to ten times, then in the absence of the recovery point relaxation condition it may be necessary to keep track of ten different physical registers assigned for those ten writes. However, if the recovery point relaxation condition is in place, the reorder buffer may only need to keep one record providing a single recovery point instead of keeping track of ten possible recovery points. Similar savings may also be achieved when forwarding paths are used in situations where this avoids a register write being needed at all for some of the accesses.

Furthermore, as will be apparent from the earlier discussion of FIG. 7, the use of the store queue 595 can be reduced, as the results of store instructions can be committed earlier than they might otherwise be able to.

Furthermore, the earlier mentioned data lifetime information can be used to obtain additional benefits. For example, the physical registers can be freed up more quickly, certain register write operations can be avoided, and further, as will be discussed in more detail with reference to FIGS. 11A and 11B, more efficient use of forwarding paths may be possible within the execution units 580.

Figure 11A:
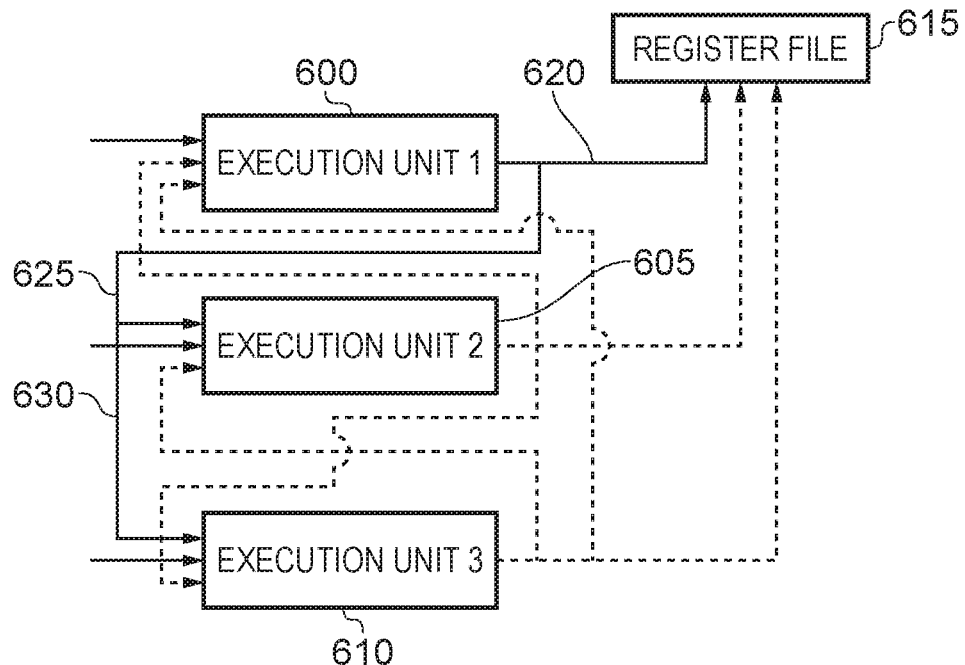
FIGS. 11A and 11B are diagrams schematically illustrating how the use of forwarding paths and register file updates may be controlled in accordance with one embodiment.
Figure 11B:
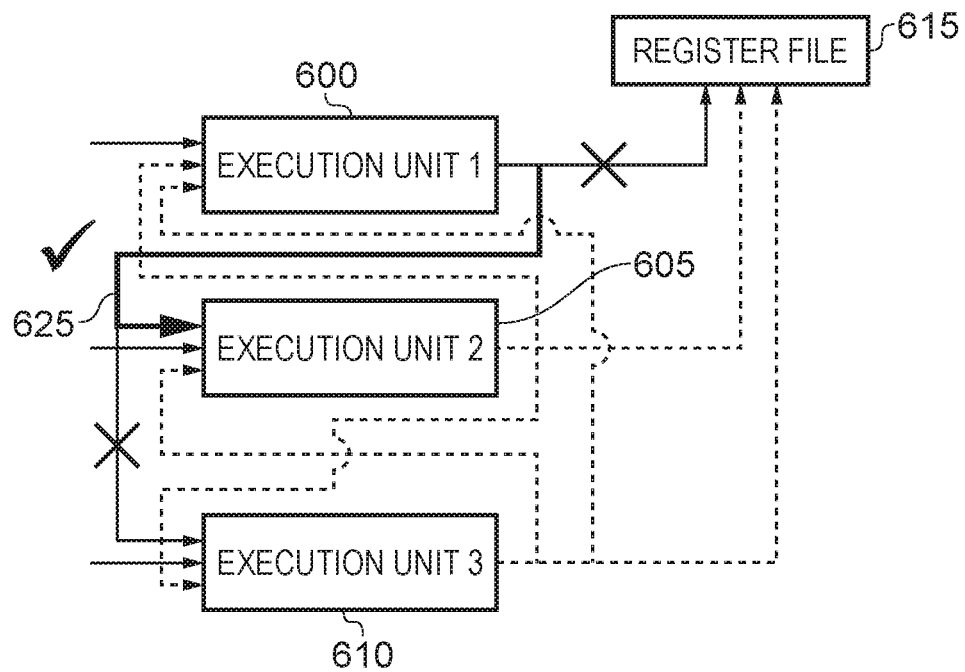

As shown in FIG. 11A, various forwarding paths may be provided between the outputs of one execution unit and the inputs of other execution units. In FIG. 11A, three execution units 600, 605, 610 are provided, and each of the execution units is able to output its results for storage within the register file 615. Further, in this figure, the output from each execution unit is provided over a forwarding path as an input to each of the other execution units. For execution units 605 and 610, these various paths are shown as dotted lines. For the execution unit 600, the output path 620 allows data to be written to the register file 615, whilst a first forwarding path 625 allows the output from execution unit 600 to be provided as an input to execution unit 605, and the other forwarding path 630 allows the output from execution unit 600 to be provided as an input to execution unit 610.

Without accurate data lifetime information, it will typically be the case that the output from the execution unit 600 must be written to the register file 615, as it is not known whether the result will be used again. Further, to the extent that the forwarding paths are used, it is often necessary to broadcast the information over all of the forwarding paths, as it is not known which execution units may make use of that data. However, with accurate data lifetime information, it may be possible for example to determine that the output data value from execution unit 600 will only be used once, as an input to the operation that is being forwarded to execution unit 605. In this instance, it may be possible to activate the forwarding path 625, but not activate the forwarding path 630. It may also be possible to deactivate the write to the register file 615. This can give rise to significant power consumption improvements.

Figure 12:
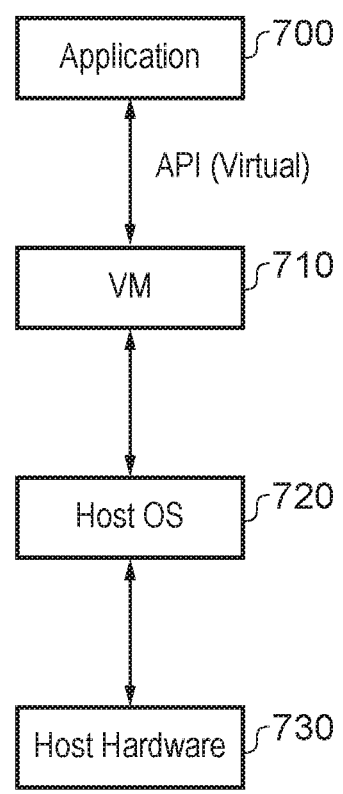
FIG. 12 illustrates a virtual machine implementation that may be used.

FIG. 12 illustrates a virtual machine implementation that may be used. Whilst the earlier described embodiments implement the present techniques in terms of apparatus and methods for operating specific processing hardware supporting the techniques concerned, it is also possible to provide so-called virtual machine implementations of hardware devices. These virtual machine implementations run on a host processor 730 running a host operating system 720 supporting a virtual machine program 710. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 710 may be stored on a computer-readable storage medium (which may be a non-transitory medium), and provides an application program interface (instruction execution environment) to an application program 700 which is the same as the application program interface which would be provided by the real hardware which is the device being modelled by the virtual machine program 710. Thus, the described techniques for allowing the software to identify situations where the recovery point constraint can be relaxed, for example through use of the different instruction variants described herein, may be applied within the application program 700, using the virtual machine program 710 to model the required interaction with the virtual machine hardware.

As will be apparent from the above discussions, the techniques described herein provide mechanisms by which the ISA may allow the software to inform the hardware of situations where certain ISA constraints can be relaxed, allowing more efficient processing. In particular, it has been found that under certain conditions, a number of common data processing workloads can be processed at higher performance with less hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus comprising:
   processing circuitry having an associated instruction set architecture, and arranged to execute software comprising instructions defined by the instruction set architecture; and
   control circuitry to control operation of the processing circuitry according to constraints defined by the instruction set architecture;
   the instruction set architecture defining a default recovery point constraint for determining a recovery point from which to resume instruction execution following handling of an unexpected change in instruction flow; and the control circuitry being responsive to information derived from the software executing on the processing circuitry to detect a recovery point relaxation condition, and responsive to said recovery point relaxation condition to allow determination of the recovery point unconstrained by the default recovery point constraint, wherein:

said software comprises one or more memory access instructions used to move data between memory and registers accessible to the processing circuitry; and said recovery point relaxation condition is determined when said information derived from the software executing on the processing circuitry identifies one or more of said memory access instructions as being repeatable.

2. The apparatus as claimed in claim 1, wherein responsive to the recovery point relaxation condition the control circuitry is arranged to cause the recovery point to be determined in accordance with a relaxed recovery point constraint providing increased flexibility as to the choice of recovery point when compared with the default recovery point constraint.

3. The apparatus as claimed in claim 1, wherein:

the processing circuitry is arranged to retain execution state for determined execution points within the software being executed by the processing circuitry, to enable one of the determined execution points to be selected as the recovery point on resuming instruction execution following handling of said unexpected change in instruction flow; and in the presence of the recovery point relaxation condition, the control circuitry is arranged to cause an increase in the number of instructions executed between each determined execution point for which said execution state is retained.

4. The apparatus as claimed in claim 1, wherein in the presence of the recovery point relaxation condition, the recovery point is settable to an execution point in the software prior to a memory access instruction identified as repeatable, irrespective of whether the unexpected change in instruction flow occurs at an execution point after that memory access instruction.

5. The apparatus as claimed in claim 1, wherein:

the instruction set architecture provides one or more memory access instructions defined as repeatable memory access instructions; and said recovery point relaxation condition is determined when the processing circuitry is executing a section of code within the software whose memory access instructions are said repeatable memory access instructions.

6. The apparatus as claimed in claim 1, further comprising:

control storage comprising a recovery point relaxation field whose value is set under control of the software executing on the processing circuitry;

wherein said recovery point relaxation condition is determined when the processing circuitry is executing a section of code containing at least one memory access instruction, and the value in said recovery point relaxation field is set to a first value identifying that said at least one memory access instruction is repeatable.

7. The apparatus as claimed in claim 1, wherein:

each memory access instructions specifies a virtual address, and the processing circuitry is arranged on executing each memory access instruction to perform an address translation operation with reference to one or more page table entries in memory in order to identify, for the specified virtual address, a corresponding physical address to be accessed; and said recovery point relaxation condition is determined when the processing circuitry is executing a section of code containing at least one memory access instruction, and during the address translation operation a software-controlled field within at least one page table entry identifies that a memory access instruction accessing a region of memory associated with that page table entry is repeatable.

8. The apparatus as claimed in claim 1, wherein the processing circuitry is arranged, for a section of code containing multiple memory access instructions that are identified as being repeatable, to avoid performing address hazard checking for the addresses to be accessed for those multiple memory access instructions.

9. The apparatus as claimed in claim 8, wherein, following execution of a section of code containing at least one memory access instruction that is repeatable, the software is arranged to cause the processing circuitry to execute a barrier operation to re-enable address hazard checking prior to execution of subsequent memory access instructions that cannot be guaranteed by the software to be repeatable.

10. The apparatus as claimed in claim 1, wherein:

said memory access instructions identified as repeatable comprise at least one store instruction executed in order to store data from one or more registers to the memory; and the processing circuitry is arranged, when executing a section of code in the presence of said recovery point relaxation condition, to allow the data identified by a store instruction that is identified as a repeatable store instruction to be stored to memory, irrespective of whether an exception state of another memory access instruction marked as repeatable within said section of code is at that point unresolved.

11. The apparatus as claimed in claim 10, wherein the processing circuitry is arranged, when executing a section of code in the presence of said recovery point relaxation condition, to allow the data identified by the repeatable store instruction to be stored to memory, irrespective of whether correctness of branch resolution of a prior branch instruction is at that point determined.

12. The apparatus as claimed in claim 11, wherein the prior branch instruction is flagged so as to prevent that prior branch instruction inhibiting completion of the repeatable store instruction.

13. The apparatus as claimed in claim 1, wherein said unexpected change in instruction flow is caused by one or more of:

at least one type of exception occurring; and a branch resteer operation occurring.

14. The apparatus as claimed in claim 13, wherein said at least one type of exception comprises a translation abort triggered by the processing circuitry being unable to translate a virtual address specified by a memory access instruction into a valid physical address within memory.

15. The apparatus as claimed in claim 13, wherein said branch resteer operation is triggered when a target address of a branch instruction within the software is mispredicted.

16. The apparatus as claimed in claim 3, wherein in the presence of the recovery point relaxation condition, the processing circuitry is arranged to allow fusing of operations specified by two or more of the instructions executed between each determined execution point for which said execution state is retained.

17. The apparatus as claimed in claim 3, wherein in the presence of the recovery point relaxation condition, the number of instructions executed between each determined execution point for which said execution state is retained comprises instructions forming multiple iterations of a loop within the software.

18. The apparatus as claimed in claim 1, further comprising:
a plurality of registers accessible to the processing circuitry when executing the software;
wherein:
the instruction set architecture provides multiple variants of one or more instructions, including at least one lifetime indicating variant providing a lifetime indication for at least one register identified by that instruction; and
the control circuitry is arranged to control operation of the processing circuitry dependent on said lifetime indication.

19. The apparatus as claimed in claim 18, wherein:
the processing circuitry is arranged to use the lifetime indication to perform one or more of:
freeing a register for re-use when the lifetime indication indicates that the data value stored in that register is no longer required;
determining a forwarding path to employ to forward a result value of a first operation for use as an input to circuitry performing a subsequent operation;
preventing storage of a result value to a register when the lifetime indication indicates that no subsequent access to that register to obtain the result value will be required;
fusing the operations specified by first and second instructions when a result value produced by execution of the first instruction is only used as an input to the second instruction.

20. The apparatus as claimed in claim 18, wherein said at least one lifetime indicating variant of an instruction comprises one or more of:
a sink variant of the instruction identifying that at least one source value for the instruction is unrequired by subsequent instructions;
a limited use variant of the instruction providing subsequent use information for at least one value identified by the instruction.

21. The apparatus as claimed in claim 20, wherein the limited use variant of the instruction identifies a number of subsequent uses for at least one value identified by the instruction.

22. The apparatus as claimed in claim 18, wherein the instruction set architecture provides a value kill instruction to identify one or more registers whose stored value is obsolete.

23. The apparatus as claimed in claim 1, wherein when the processing circuitry is executing at least one section of code, the control circuitry is prevented from detecting the recovery point relaxation condition, so as to ensure that the default recovery point constraint is applied when executing said at least one section of code.

24. A method of determining a recovery point from which to resume instruction execution following handling of an unexpected change in instruction flow, the method comprising:
executing software on processing circuitry having an associated instruction set architecture, the software comprising instructions defined by the instruction set architecture;
controlling operation of the processing circuitry according to constraints defined by the instruction set architecture;
defining within the instruction set architecture a default recovery point constraint for determining the recovery point;
detecting presence of a recovery point relaxation condition based on information derived from the software executing on the processing circuitry; and
responsive to detection of said recovery point relaxation condition, allowing determination of the recovery point unconstrained by the default recovery point constraint;
wherein:
said software comprises one or more memory access instructions used to move data between memory and registers accessible to the processing circuitry; and
said recovery point relaxation condition is determined when said information derived from the software executing on the processing circuitry identifies one or more of said memory access instructions as being repeatable.

* * * * *